United States Patent
Kaul et al.

(10) Patent No.: US 10,534,994 B1
(45) Date of Patent: Jan. 14, 2020

(54) SYSTEM AND METHOD FOR HYPER-PARAMETER ANALYSIS FOR MULTI-LAYER COMPUTATIONAL STRUCTURES

(71) Applicant: Cadence Design Systems, Inc., San Jose, CA (US)

(72) Inventors: Piyush Kaul, Delhi (IN); Samer Lutfi Hijazi, San Jose, CA (US); Raul Alejandro Casas, Doylestown, PA (US); Rishi Kumar, Jalandhar (IN); Xuehong Mao, San Jose, CA (US); Christopher Rowen, Santa Cruz, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 1059 days.

(21) Appl. No.: 14/938,370

(22) Filed: Nov. 11, 2015

(51) Int. Cl.
*G06N 3/04* (2006.01)
*G06N 3/08* (2006.01)

(52) U.S. Cl.
CPC ............... *G06N 3/04* (2013.01); *G06N 3/08* (2013.01)

(58) Field of Classification Search
CPC ............ G06F 16/3326; G06F 16/3334; G06F 16/683; G06F 16/902; G06F 16/94; G06F 16/9535; G06F 21/6245; G06F 21/6254; G06K 9/00228; G06K 9/4628; G06K 9/6232; G06K 9/6256; G06K 9/6269; G06N 20/00; G06N 3/0454; G06N 3/082; G06T 7/12; G06T 9/002
See application file for complete search history.

(56) References Cited

U.S. PATENT DOCUMENTS

| | | | | |
|---|---|---|---|---|
| 5,812,992 | A * | 9/1998 | de Vries | G06N 3/082 706/25 |
| 9,978,013 | B2 * | 5/2018 | Kaufhold | G01S 7/417 |
| 10,210,631 | B1 * | 2/2019 | Cinnamon | G06T 11/003 |
| 10,268,646 | B2 * | 4/2019 | Jaech | G06F 16/3334 |

(Continued)

OTHER PUBLICATIONS

Sakhavi, S, Guan, C, Yan, S. ( 2015): Parallel convolutional-linear neural network for motor imagery classification. In Signal Processing Conference (EUSIPCO), Aug. 2015, pp. 2736-2740. (Year: 2015).*

(Continued)

*Primary Examiner* — Paulinho E Smith
(74) *Attorney, Agent, or Firm* — Mark H. Whittenberger, Esq.; Holland & Knight LLP

(57) ABSTRACT

The present disclosure relates to a computer-implemented method for analyzing one or more hyper-parameters for a multi-layer computational structure. The method may include accessing, using at least one processor, input data for recognition. The input data may include at least one of an image, a pattern, a speech input, a natural language input, a video input, and a complex data set. The method may further include processing the input data using one or more layers of the multi-layer computational structure and performing matrix factorization of the one or more layers. The method may also include analyzing one or more hyper-parameters for the one or more layers based upon, at least in part, the matrix factorization of the one or more layers.

46 Claims, 16 Drawing Sheets

(56) References Cited

U.S. PATENT DOCUMENTS

2001/0044719 A1* 11/2001 Casey .................... G10L 15/02
 704/245
2008/0159622 A1* 7/2008 Agnihotri .......... G06K 9/00228
 382/157
2018/0018590 A1* 1/2018 Szeto ................. G06F 21/6254

OTHER PUBLICATIONS

Siebel et al., "Efficient Neural Network Pruning During Neuro-Evolution", Proceedings of International Joint Conference on Neural Network, Jun. 19, 2009, pp. 2920-2927 (Year: 2009).*

* cited by examiner

300

600

700

1100 accessing, using at least one processor, input data for recognition, wherein the file includes at least one of an image, a pattern, a speech input, a natural language input, a video input, and a complex data set

1102 processing the input data using one or more layers of the multi-layer computational structure

1104 performing matrix factorization of the one or more layers

1106 analyzing one or more hyper-parameters of the one or more layers based upon, at least in part, the matrix factorization of the one or more layers

SYSTEM AND METHOD FOR HYPER-PARAMETER ANALYSIS FOR MULTI-LAYER COMPUTATIONAL STRUCTURES

FIELD OF THE INVENTION

The present disclosure relates to pattern and image recognition, and more specifically, to analyzing hyper-parameters of a multi-layer computational structure.

DISCUSSION OF THE RELATED ART

Hyper-parameter analysis for a multi-layer computational structure involves experimentation by running a series of tests against the validation set while varying the hyper-parameters at each layer, and finding the corresponding performance. An optimal hyper-parameter is chosen based on the best performance against the validation set. Since the validation set is independent from the training set, and meant specifically for model-selection, this is a valid means of selecting all the hyper-parameters of a multi-layer computational structure. However this is time-consuming task and may require some guesswork.

There are also certain rules of thumb that can be employed, for example, trying to keep the computations constant across layers by increasing the number of feature maps for the later layers in proportion to the reduction in spatial dimensions. However these rule of thumb are unreliable and have little theoretical justification.

SUMMARY

In one or more embodiments of the present disclosure, a computer-implemented method for analyzing hyper-parameters of a multi-layer computational structure is provided. The method may include accessing, using at least one processor, input data for recognition. In some embodiments, the input data may include, but is not limited to, at least one of an image, a pattern, a speech input, a natural language input, a video input, and a complex data set. The method may further include processing the input data using one or more layers of the multi-layer computational structure. The method may also include performing matrix factorization of the one or more layers. The method may further include analyzing one or more hyper-parameters for the one or more layers based upon, at least in part, the matrix factorization of the one or more layers.

One or more of the following features may be included. In some embodiments, the method may include training one or more filters of the one or more layers. In some embodiments, the method may also include converting one or more trained filters of the one or more layers to a plurality of vectors. The method may further include generating a covariance matrix using the plurality of vectors. In some embodiments, performing matrix factorization may include determining an amount of energy retained for one or more basis weight values of the one or more layers based upon, at least in part, the covariance matrix. In some embodiments, analyzing one or more hyper-parameters may be further based upon, at least in part, whether the amount of energy retained exceeds an energy threshold. The method may also include receiving a complexity target and adjusting the energy threshold until the complexity target is achieved. In some embodiments, analyzing one or more hyper-parameters for the one or more layers can be performed iteratively for each of the one or more layers. The method may additionally include re-training one or more filters from the one or more layers based upon, at least in part, one or more analyzed hyper-parameters for the one or more layers until one or more hyper-parameters has been analyzed for each of the one or more layers. In some embodiments, the one or more hyper-parameters may include, but are not limited to, one or more of a number of feature maps for each of the one or more layers and a number of weights for each of the one or more layers.

In some embodiments, the multi-layer computational structure may be one or more of a neural network with shared weights, a convolutional neural network, a deep belief network, a recurrent neural network and an autoencoder. Analyzing the one or more hyper-parameters for the one or more layers may be further based upon, at least in part, one or more of balancing a computational load between the one or more layers of the multi-layer computational structure, reducing overfitting, and improving detection performance.

The method may further include retraining one or more filters of the one or more layers, based upon, at least in part, the analyzing of the one or more hyper-parameters of the one or more layers. In some embodiments, retraining one or more layers may be performed iteratively. In some embodiments, retraining one or more layers may be one or more of a partial retraining of each layer of the one or more layers and a complete retraining of each layer of the one or more layers. In some embodiments, the multi-layer computational structure includes, but is not limited to, at least one of: one or more pooling layers, one or more non-linear functions, one or more convolution layers with uniform filters and one or more convolutional layers with non-uniform layers. In some embodiments, wherein the multi-layer computational structure may include, but is not limited to, a plurality of hybrid layers. In some embodiments, the feature maps of each of the plurality of hybrid layers may be associated with one or more different feature maps of one or more previous layers.

In another embodiment of the present disclosure a system for analyzing hyper-parameters of a multi-layer computational structure is provided. The system may include a computing device having at least one processor configured to access input data for recognition. In some embodiments, the input data may at least one of an image, a pattern, a speech input, a natural language input, a video input, and a complex data set. The least one processor may be further configured to process the input data using one or more layers of the multi-layer computational structure. In some embodiments, the at least one processor may be further configured to perform matrix factorization of the one or more layers. In some embodiments, the at least one processor may be further configured to analyze one or more hyper-parameters for the one or more layers based upon, at least in part, the matrix factorization of the one or more layers.

One or more of the following features may be included. In some embodiments, the at least one processor may be further configured to train one or more filters of the one or more layers. The at least one processor may be further configured to convert one or more trained filters to a plurality of vectors. In some embodiments, the at least one processor may be further configured to generate a covariance matrix using the plurality of vectors. In some embodiments, performing matrix factorization may include determining an amount of energy retained for one or more basis weight values of the one or more layers based upon, at least in part, the covariance matrix. Analyzing one or more hyper-parameters for the one or more layers may be further based upon, at least in part, whether the amount of energy retained exceeds an energy threshold. The at least one processor may be further configured to receive a complexity target and reduce the energy threshold until the complexity target is achieved. In some embodiments, analyzing one or more hyper-parameters for the one or more layers can be performed iteratively for each of the one or more layers. The at least one processor may be further configured to retrain the one or more filters from the one or more layers based upon, at least in part, one or more analyzed hyper-parameters for the one or more layers until one or more hyper-parameters has been analyzed for each of the one or more layers.

In some embodiments, the multi-layer computational structure may be one or more of a neural network with weights, a convolutional neural network, a deep belief network, a recurrent neural network and an autoencoder. The at least one processor may be further configured to analyze the one or more hyper-parameters for the one or more layers based upon, at least in part, one or more of balancing a computational load between the one or more layers of the multi-layer computational structure, reducing overfitting, and improving detection performance. In some embodiments, the one or more hyper-parameters may include, but are not limited to, one or more of a number of feature maps for each of the one or more layers and a number of weights for each of the one or more layers.

In some embodiments, the at least one processor may be further configured to retrain the one or more filters of the one or more layers, based upon, at least in part, the analyzing of the one or more hyper-parameters of the one or more layers. In some embodiments, retraining one or more layers may be performed iteratively. In some embodiments, retraining one or more layers may be one or more of a partial retraining of each layer of the one or more layers and a complete retraining of each layer of the one or more layers. In some embodiments, the multi-layer computational structure includes, but is not limited to, at least one of: one or more pooling layers, one or more non-linear functions, one or more convolution layers with uniform filters, and one or more convolutional layers with non-uniform layers. In some embodiments, wherein the multi-layer computational structure may include, but is not limited to, a plurality of hybrid layers. In some embodiments, the feature maps of each of the plurality of hybrid layers may be associated with one or more different feature maps of one or more previous layers.

In yet another embodiment of the present disclosure a computer-readable storage medium having stored thereon instructions that when executed by a machine result in a number of operations is provided. Some operations may include accessing input data for recognition. In some embodiments, the input data may include, but is not limited to, at least one of an image, a pattern, a speech input, a natural language input, a video input, and a complex data set. Operations may further include processing the input data using one or more layers of the multi-layer computational structure. Operations may also include performing matrix factorization of the one or more layers. Operations may further include analyzing one or more hyper-parameters for the one or more layers based upon, at least in part, the matrix factorization of the one or more layers.

One or more of the following features may be included. In some embodiments, Operations may include training one or more filters of the one or more layers. In some embodiments, the operations may further include converting one or more trained filters of the first layer to a plurality of vectors. Operations may also include generating a covariance matrix using the plurality of vectors. In some embodiments, performing matrix factorization may include determining an amount of energy retained for one or more basis weight values of the one or more layers based upon, at least in part, the covariance matrix. Analyzing one or more hyper-parameters of the one or more layers may be further based upon, at least in part, whether the amount of energy retained exceeds an energy threshold. Operations may further include receiving a complexity target and adjusting the energy threshold until the complexity target is achieved. In some embodiments, analyzing one or more hyper-parameters for the one or more layers can be performed iteratively for each of the one or more layers. Operations may further include retraining the one or more filters from the one or more layers based upon, at least in part, one or more analyzed hyper-parameters for the one or more layers until one or more hyper-parameters has been analyzed for each of the one or more layers.

In some embodiments, the multi-layer computational structure may be one or more of a neural network with weights, a convolutional neural network, a deep belief network, a recurrent neural network and an autoencoder. Analyzing the one or more hyper-parameters for the one or more layers may be further based upon, at least in part, one or more of balancing a computational load between the one or more layers of the multi-layer computational structure, reducing overfitting, and improving detection performance. In some embodiments, the one or more hyper-parameters may include, but are not limited to, one or more of a number of feature maps for each of the one or more layers and a number of weights for each of the one or more layers.

In some embodiments, operations may further include retraining the one or more filters of the one or more layers, based upon, at least in part, the analyzing of the one or more hyper-parameters of the one or more layers. In some embodiments, retraining one or more layers may be performed iteratively. In some embodiments, retraining one or more layers may be one or more of a partial retraining of each layer of the one or more layers and a complete retraining of each layer of the one or more layers. In some embodiments, the multi-layer computational structure includes, but is not limited to, at least one of: one or more pooling layers, one or more non-linear functions, one or more convolution layers with uniform filters, and one or more convolutional layers with non-uniform layers. In some embodiments, wherein the multi-layer computational structure may include, but is not limited to, a plurality of hybrid layers. In some embodiments, the feature maps of each of the plurality of hybrid layers may be associated with one or more different feature maps of one or more previous layers.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

FIG. 11 is a flowchart depicting operations incorporating the hyper-parameter analysis process in accordance with an embodiment of the present disclosure;

DETAILED DESCRIPTION

Figure 1:
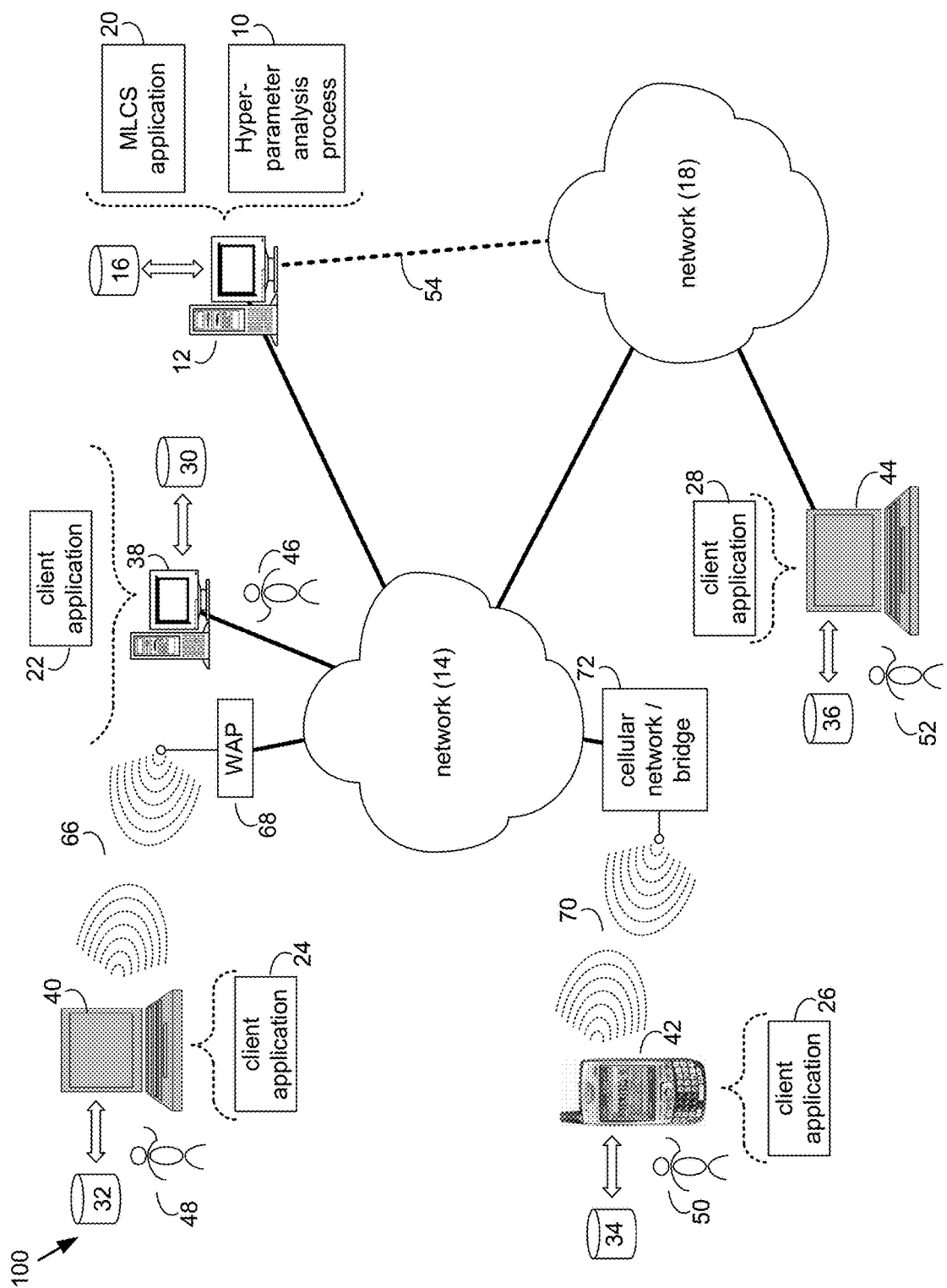
FIG. 1 is a diagram depicting an embodiment of a system in accordance with the present disclosure.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown hyper-parameter analysis process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, the hyper-parameter analysis process 10 may reside on and be executed, in whole or in part, by a client electronic device, such as a personal computer, notebook computer, personal digital assistant, or the like.

As will be discussed below in greater detail, hyper-parameter analysis process 10 may access, using at least one processor, input data for recognition. Hyper-parameter analysis process 10 may process the input data using one or more layers of the multi-layer computational structure. Hyper-parameter analysis process 10 may also perform matrix factorization of the one or more layers. Hyper-parameter analysis process 10 may further analyze one or more hyper-parameters for the one or more layers based upon, at least in part, the matrix factorization of the one or more layers.

The instruction sets and subroutines of hyper-parameter analysis process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks. In one embodiment, the hyper-parameter analysis process 10 may access input data for recognition. In one example, server computer 12 may execute the hyper-parameter analysis process 10 by accessing input data stored in storage device 16 for recognition.

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example. In some embodiments, accessing the input data for recognition may include receiving an input for recognition. In one example, server computer 12 may access input data for recognition by receiving an input from network 14 or network 18. In another example, server computer 12 may access input data by receiving input data via an external sensor (not shown) that is configured to be coupled to the server computer 12.

Server computer 12 may execute a multi-layer computational structure simulation (MLCS) application (e.g., MLCS application 20). MLCS application 20 may interact with one or more MLCS client applications (e.g., MLCS client applications 22, 24, 26, 28) for hyper-parameter analysis. MLCS application 20 may use hyper-parameter analysis process 10 as part of an automated tool for generation, parameterization and performance improvement of a multi-layer computational structure. In some embodiments, MLCS application may interact with the hyper-parameter analysis process as part of an automated tool or script for complexity reduction of a multi-layer computational structure.

In some embodiments, hyper-parameter analysis process 10 may be a stand-alone application, or may be an applet/application/script that may interact with and/or be executed within MLCS application 20. In addition/as an alternative to being a server-side process, the hyper-parameter analysis process 10 may be a client-side process (not shown) that may reside on a client electronic device (described below) and may interact with an MLCS client application (e.g., one or more of MLCS client applications 22, 24, 26, 28). Further, the hyper-parameter analysis process 10 may be a hybrid server-side/client-side process that may interact with MLCS application 20 and an MLCS client application (e.g., one or more of client applications 22, 24, 26, 28). As such, the hyper-parameter analysis process 10 may reside, in whole, or in part, on server computer 12 and/or one or more client electronic devices.

The instruction sets and subroutines of MLCS application 20, which may be stored on storage device 16 coupled to server computer 12 may be executed by one or more processors (not shown) and one or more memory modules (not shown) incorporated into server computer 12.

The instruction sets and subroutines of MLCS client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access MLCS application 20 and may allow users to e.g., utilize hyper-parameter analysis process 10. In some embodiments, accessing input data for recognition can include accessing input data stored in a storage device 30, 32, 34, 36 associated with electronic device 38, 40, 42, 44.

Users 46, 48, 50, 52 may access MLCS application 20 directly through the device on which the client application (e.g., client applications 22, 24, 26, 28) is executed, namely client electronic devices 38, 40, 42, 44, for example. Users 46, 48, 50, 52 may access MLCS application 20 directly through network 14 or through secondary network 18. Further, server computer 12 (i.e., the computer that executes MLCS application 20) may be connected to network 14 through secondary network 18, as illustrated with phantom link line 54. In some embodiments, accessing input data for recognition at an electronic device 38, 40, 42, 44 can include receiving an input from a server computer 12 through one or more of network 14 and secondary network 18.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.)

Figure 2:
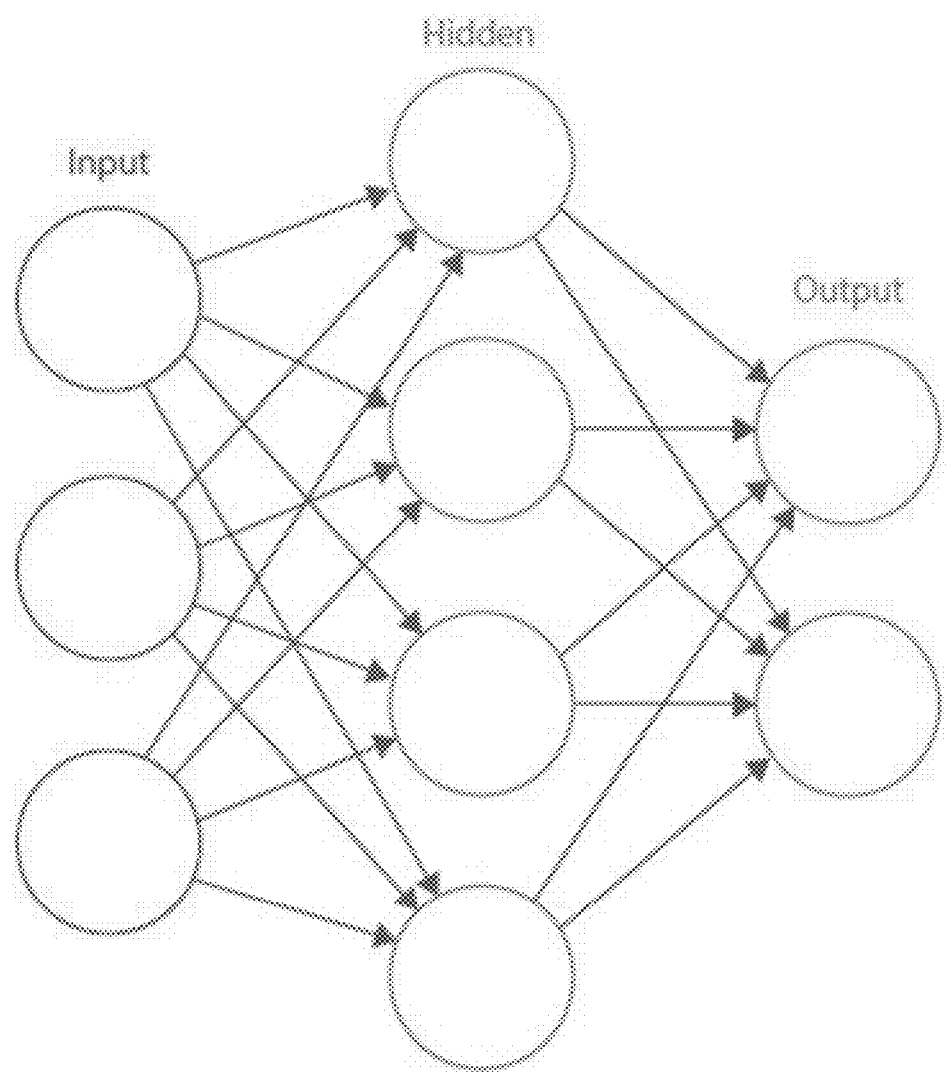
FIG. 2 is a diagram depicting an embodiment related to multi-layer computational structures.

Referring also to FIG. 2, a multi-layer computational structure may include a system of interconnected "neurons" which may exchange messages between each other. The connections may have numeric weights that may be tuned during the training process, so that a properly trained structure may respond correctly when presented with an file. Some input data may include, but are not limited to, at least one of an image, a pattern, a speech input, a natural language input, a video input, a signal capable of being received by a sensor, and a complex data set. A complex data set as used herein may include, but is not limited to network traffic, medical information, financial transactions, behavior of humans and animals, a stored data set, live data stream, etc. The multi-layer computational structure may consist of multiple layers of feature-detecting neurons. Each layer may have many neurons that can each respond to a different combination of as from the previous layers. The layers may be built up so that the first layer can detect a set of primitive patterns in the input data. The second layer may detect patterns of patterns, the third layer may detect patterns of those patterns, etc.

Figure 3:
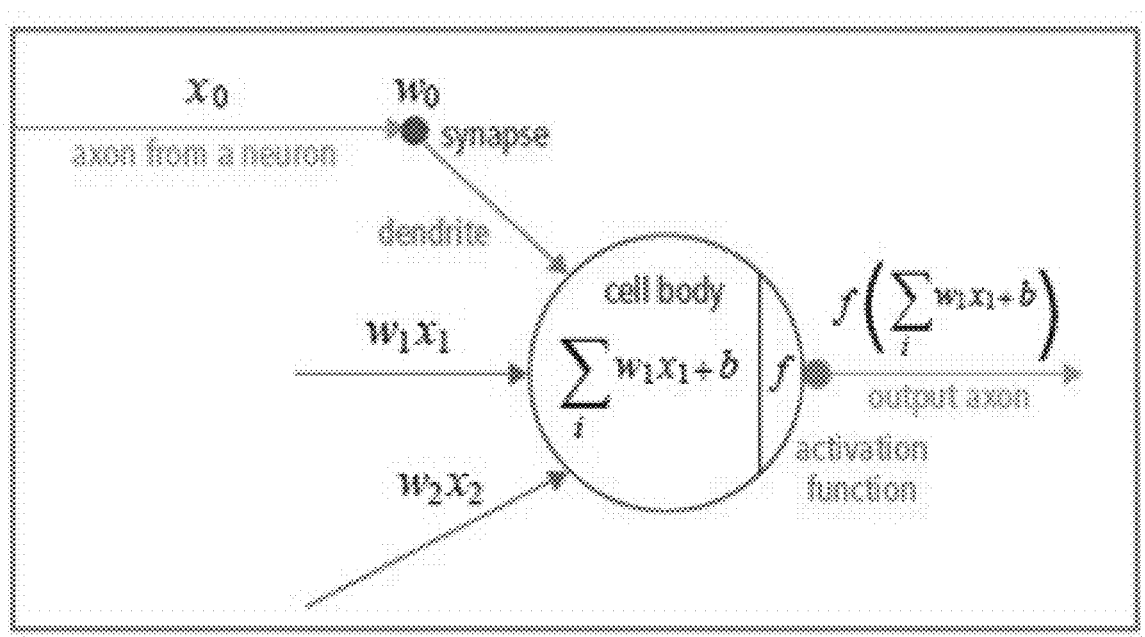
FIG. 3 is a diagram depicting a neuron of a multi-layer computational structure in accordance with an embodiment of the present disclosure.

Referring now to FIG. 3, in a multi-layer computational structure, being compared to a biological neural network for example purposes only, a neuron can receive input signals at one or more synapses of one or more dendrites. The neuron can produce output signals along one or more axons. One or more axons of a neuron can be connected to one or more dendrites of additional neurons. These connections can be axon branches. A combination of signals received at a neuron can exceed a threshold condition and the neuron can be activated. An activation of a neuron can be communicated to successor neurons. An input can be received by a neuron along an axon branch. The input can multiplicatively interact with the dendrite of the neuron based on a synaptic weight assigned to the synapse of the dendrite. A synaptic weight can be learned and may control the influence of one neuron or another. The dendrites can carry the signal to the cell body, where they all are summed. If the final sum is above a specified threshold, the neuron may fire, sending a spike along its axon. In the computational model, it is assumed that the precise timings of the firing may not matter and only the frequency of the firing may communicate information. Based on the rate code interpretation, the firing rate of the neuron can be modeled with an activation function $f$ that may represent the frequency of the spikes along the axon. A common choice of activation function may be a sigmoid. In summary, each neuron may calculate the dot product of inputs and weights, adds the bias, and applies non-linearity as a trigger function (for example, following a sigmoid response function).

Figure 4:
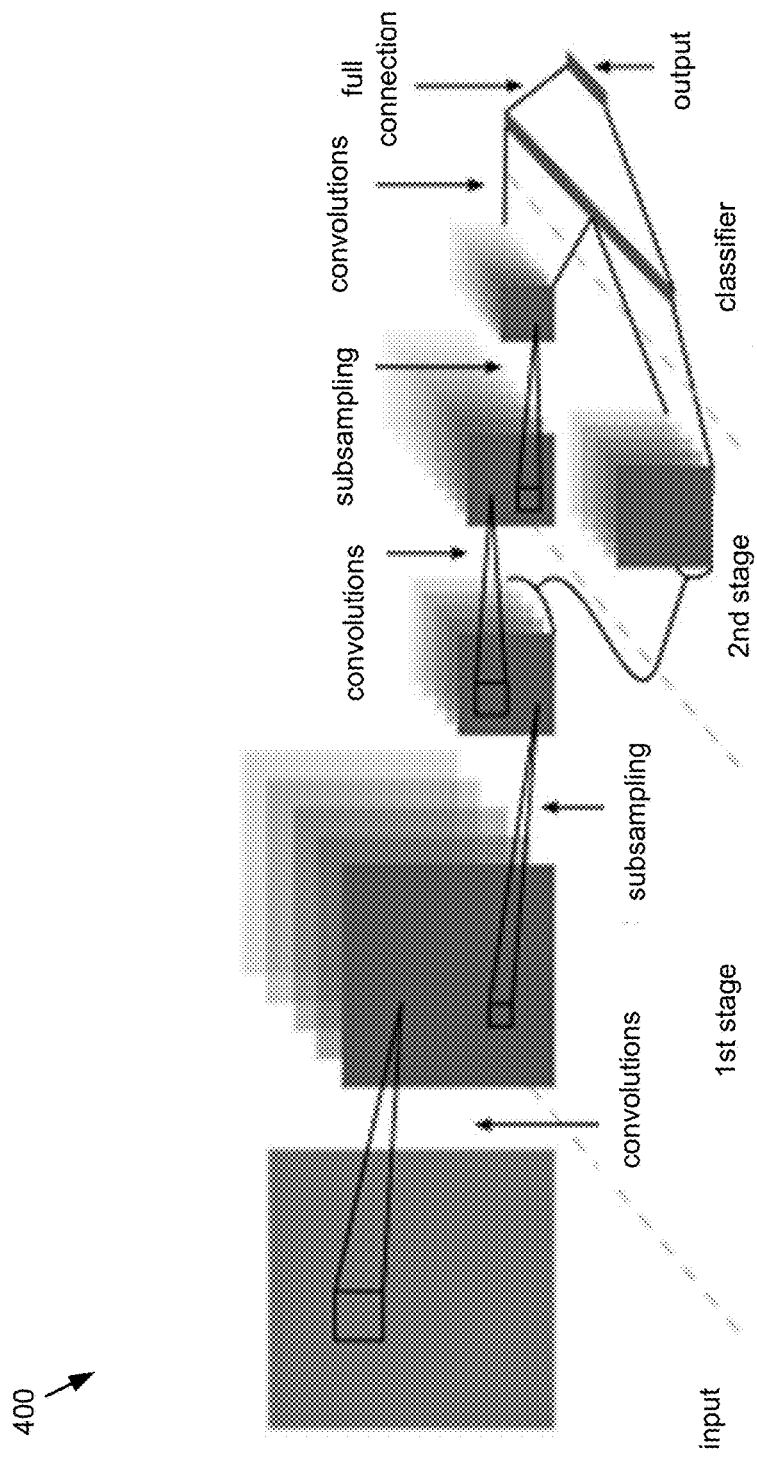
FIG. 4 is a diagram depicting a multi-layer computational structure in accordance with an embodiment of the present disclosure.

Referring to FIG. 4, a "multi-layer computational structure" as used herein may include, but is not limited to, one or more of a neural network with weights, a convolutional neural network, a deep belief network, a recurrent neural network, and an autoencoder. A convolutional neural network (CNN) is a special case of a multi-layer computational structure described above. Such convolutional neural networks may perform pattern recognition tasks and may use distinct layers of pattern recognition (e.g. from 5 to 25).

Multi-layer computational structures may be used in a variety of areas, including image and pattern recognition, speech recognition, natural language processing, and video analysis of input data. Recognition as used herein may include, but is not limited to, image recognition, pattern recognition, speech recognition, natural language processing, video analysis, etc. There are a number of reasons that multi-layer computational structures are becoming important. In traditional models for pattern recognition, feature extractors are hand designed. In multi-layer computational structures, the weights of the convolutional layer being used for feature extraction as well as the fully connected layer being used for classification may be determined during the training process. The improved network structures of multi-layer computational structures may lead to savings in memory requirements and computation complexity requirements and, at the same time, give better performance for applications where the input data or input has local correlation (e.g., image and speech). A multi-layer computational structure may be configured based upon, at least in part, one or more hyper-parameters. Hyper parameters as used herein may include, but are not limited to, parameters that govern the training of the network and describe the structure of the neural network, where that structure description may include one or more of a number of feature maps for each of the one or more layers, the connections between layers, a number of weights for each of the one or more layers, and a number of weights for each of the one or more layers used in the computation at each input position and each hidden layer position.

Large requirements of computational resources for training and evaluation of multi-layer computational structures are sometimes met by graphic processing units (GPUs), DSPs, or other silicon architectures optimized for high throughput and low energy when executing the idiosyncratic patterns of multi-layer computational structure computation. In some models for pattern/image recognition, a hand-designed feature extractor may gather relevant information from the input and may eliminate irrelevant variabilities. The extractor may be followed by a trainable classifier, a standard neural network that classifies feature vectors into classes.

In a multi-layer computational structure, convolution layers may play the role of feature extractor. But they may not be hand designed. Convolution filter kernel weights may be decided on as part of the training process. Convolutional layers may be able to extract the local features because they can restrict the receptive fields of the hidden layers to be local. Referring again to FIG. 4, the multi-layer computational structure may be configured to extract different features of the input data based upon, at least in part, one or more layers of a multi-computational structure. In one embodiment, by stacking multiple and different layers in a multi-layer computational structure, complex architectures may be built for classification problems. Four types of layers are most common: convolution layers, pooling/subsampling layers, non-linear layers, and fully connected layers.

Convolutional Layers

Figure 5:
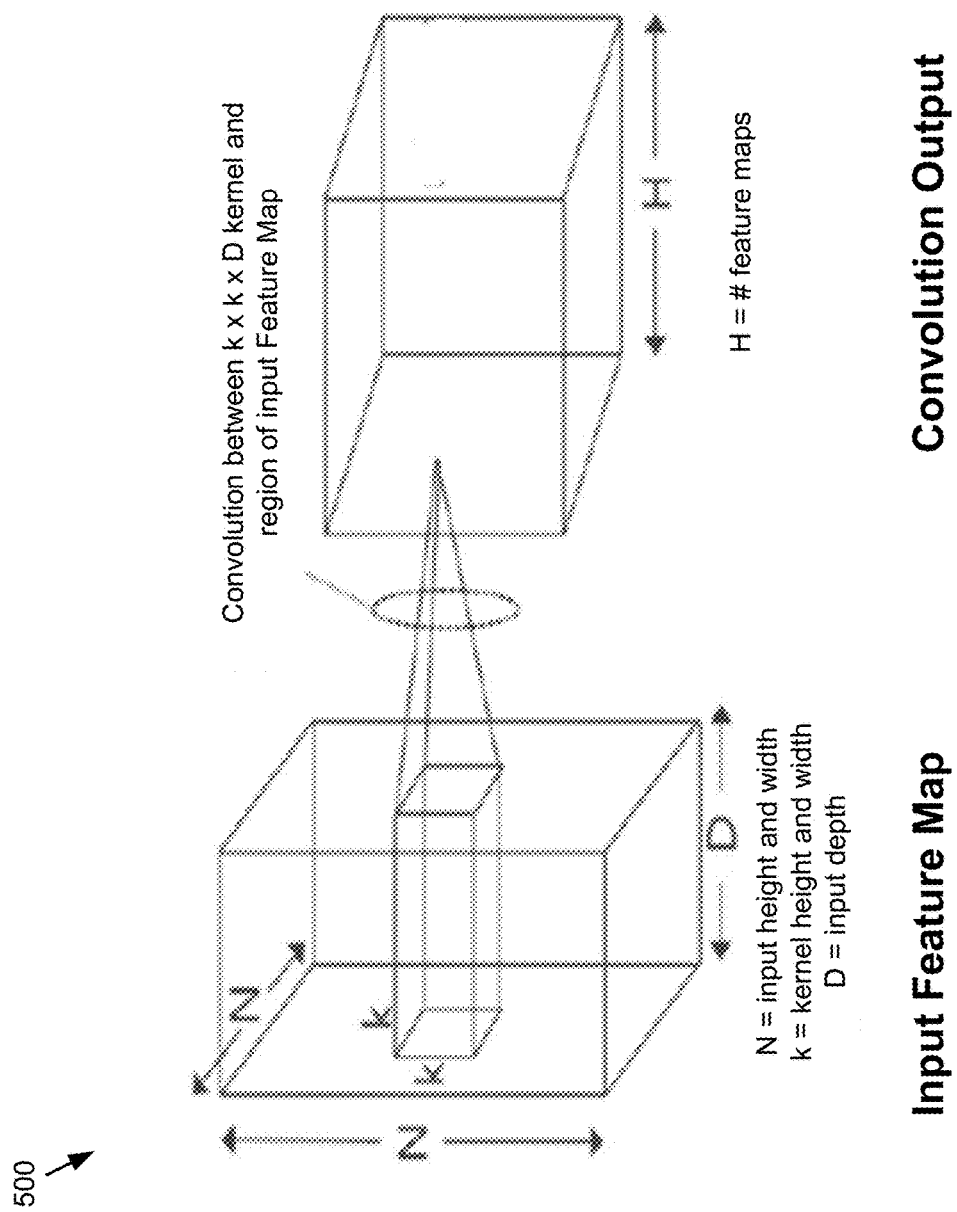
FIG. 5 is a diagram depicting a convolutional layer of a multi-layer computational structure in accordance with an embodiment of the present disclosure.

In some embodiments, a first convolution layer may extract low level features of input data, including but not limited to, edges, lines and corners. Higher level convolutional layers may extract higher level features. FIG. 5 illustrates a process of 3D convolution that can be used in multi-layer computational structures. Input data or input may be of size N×N×D elements, where "N" can be an input height and/or width in an arbitrary unit of elements and "D" can be an input depth in the arbitrary unit of elements. In one embodiment, an arbitrary unit of elements can be pixels. In some embodiments, the input can be convolved with H kernels, each of size k×k×D elements separately, where "H" can be an arbitrary number and "k" can be the kernel height and/or depth in an arbitrary unit of elements. Convolution of the input with one filter (or kernel) may produce one output feature map (or neuron). Convolution of the input with H kernels independently may produce H features maps. In one example, a kernel may move from left to right across the input one element at a time. In another example, the kernel can start from a top left corner of the input. Once an opposite corner is reached, the kernel can move one element in the downward direction, relative to the starting point, and again the kernel can move from left to right one element at a time. This process can be repeated until the kernel reaches a bottom right corner of the input. However, the kernel may be moved across the input in any direction. Additionally and/or alternatively, the computation of the H feature maps may be performed in any sequence. Further, the convolution with the one or more kernels may be done in in any order such that a convolution may be computed after all of its input values from one or more previous layers has been computed. In some embodiments, the result of a convolution of one or more layers can be used in the succeeding convolutions of the one or more layers. In other words and for example purposes only, convolution of one or more layers may be dependent on one or more resulting convolutions of one or more previous layers. In one example, input dimension N can measure 32 elements and kernel dimension k can measure 5 elements. In this example, there may be 28 unique positions from left to right and 28 unique positions from top to bottom that the kernel can take. Corresponding to these positions, each feature map in the output can contain 28×28 (i.e. (N−k)×(N−k)) elements. For each position of the kernel in sliding window process, k×k×D element of input and k×k×D elements of kernel can be multiplied and accumulated element-by-element. So, to create one element of one output feature, k×k×D multiply-accumulate operations may be required.

In some embodiments, the convolution kernel used within one output feature map (or neuron), may be shared across all pixels in two spatial dimensions ((N−k)×(N−k) region). There can be many feature maps at each layer, each of which can be trained by an algorithm. One example may include training by a back-propagation algorithm. The number of feature maps of a layer can be referred to as a feature map dimension for the layer. For example, and as shown in FIG. 5, the input data may be processed by the first layer of the multi-layer computational structure which can create multiple feature maps. The number of feature maps can be the feature map dimension for the first layer. Through multiple stages, input data or input can be processed by using one or more layers. Each layer can have one or more feature maps.

In some embodiments, the multi-layer computational structure may include hybrid layering. Hybrid layering as used herein may include, but is not limited to, one or more layers that may be associated with different feature maps in a layer being associated with different feature maps of a previous layer. In one example, one or more feature maps may be associated with one or more feature maps of one or more previous layers, while another feature map in the same layer may be associated with a different set of feature maps from the previous layers.

However, while specific examples of filters have been discussed in relation to a convolutional layer, any filter may be included within the scope of the present disclosure. For example, any non-uniform filter may be used in, for example but not limited to, a non-fixed convolutional layer. A non-fixed convolution as used herein may include, but is not limited to, different filter weights being applied to generate activations for different locations in the spatial dimensions of the convolutional layer. In some embodiments, a convolutional layer may include either uniform or non-uniform filters.

Pooling/Subsampling Layers

Figure 6:
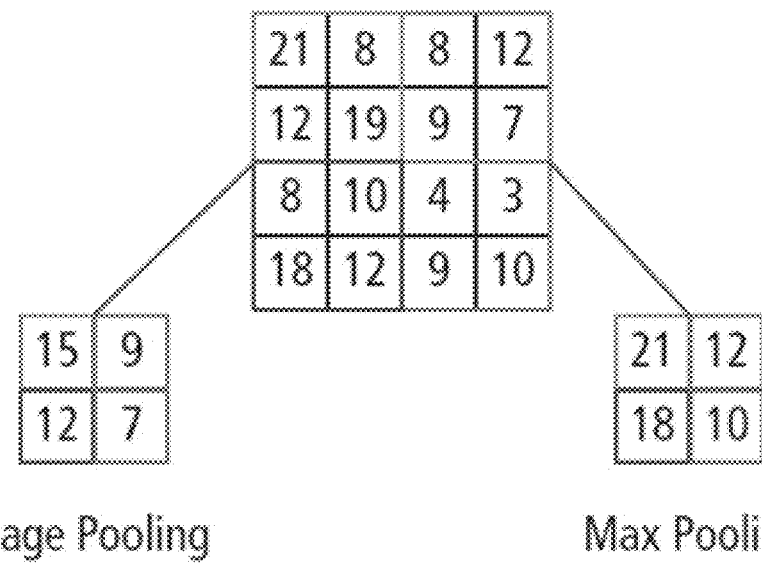
FIG. 6 is a diagram depicting a pooling/subsampling layer of a multi-layer computational structure in accordance with an embodiment of the present disclosure.

Referring also to FIG. 6, in some embodiments, the pooling/subsampling layer may reduce the resolution of the features. It can make the features robust against noise and distortion. There may be two ways to do pooling: max pooling and average pooling. In both cases, the input data or input may be divided into non-overlapping two-dimensional spaces. For example, in FIG. 4, layer 2 may be the pooling layer. Each input feature can be 28×28 and may be divided into 14×14 regions of size 2×2. For average pooling, the average of the four values in the region may be calculated. For max pooling, the maximum value of the four values may be selected. However, many other ways of reducing data can be used within the scope of the present disclosure.

FIG. 6 elaborates the pooling process further. The input can be of size 4×4. For 2×2 subsampling, a 4×4 image may be divided into four non-overlapping matrices of size 2×2. In the case of max pooling, the maximum value of the four values in the 2×2 matrix may be the output. In case of average pooling, the average of the four values can be the output. Please note that for the output with index (2,2), the result of averaging may be a fraction that has been rounded to nearest integer.

However, while specific examples of pooling/subsampling layers have been discussed, other pooling/subsampling layers may be include, but are not limited to, overlapped max and average pooling, L2-norm pooling, and pooling with strides and windows different from those described above but within the scope of the present disclosure.

Non-Linear Layers

In some embodiments, multi-layer computational structures may particular rely on a non-linear "trigger" function to signal distinct identification of likely features on each hidden layer. Multi-layer computational structures may use a variety of specific functions, such as rectified linear units (ReLUs) and continuous trigger (non-linear) functions, to efficiently implement this non-linear triggering.

ReLU

Figure 7:
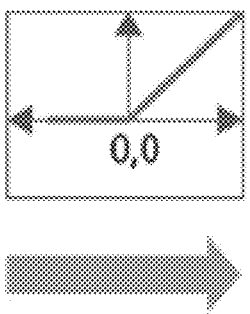
FIG. 7 is a diagram depicting a non-linear layer of a multi-layer computational structure in accordance with an embodiment of the present disclosure.

Referring now to FIG. 7, in some embodiments, a ReLU may implement the function y=max(x,0), so the input and output sizes of this layer can be the same. The ReLU may increase the nonlinear properties of the decision function and of the overall network without affecting the receptive fields of the convolution layer. In comparison to the other non-linear functions used in multi-layer computational structures (e.g., hyperbolic tangent, absolute of hyperbolic tangent, and sigmoid), the advantage of a ReLU can be that the network may train many times faster. ReLU functionality is illustrated in FIG. 7, with its transfer function plotted above the arrow.

Continuous Trigger (Non-Linear) Function

Figure 8A:
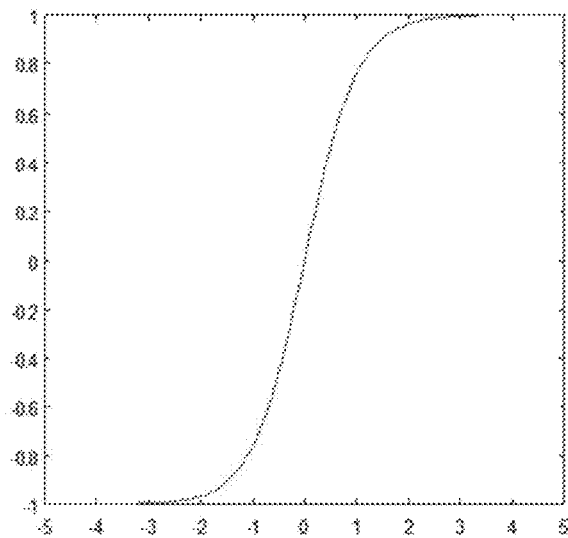
FIG. 8A is a diagram depicting an exemplary continuous trigger function of a non-linear layer of a multi-layer computational structure in accordance with an embodiment of the present disclosure.
Figure 8B:
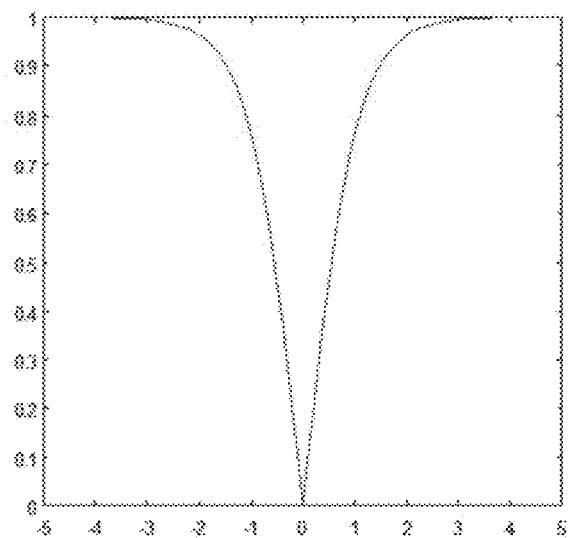
FIG. 8B is a diagram depicting an exemplary continuous trigger function of a non-linear layer of a multi-layer computational structure in accordance with an embodiment of the present disclosure.
Figure 8C:
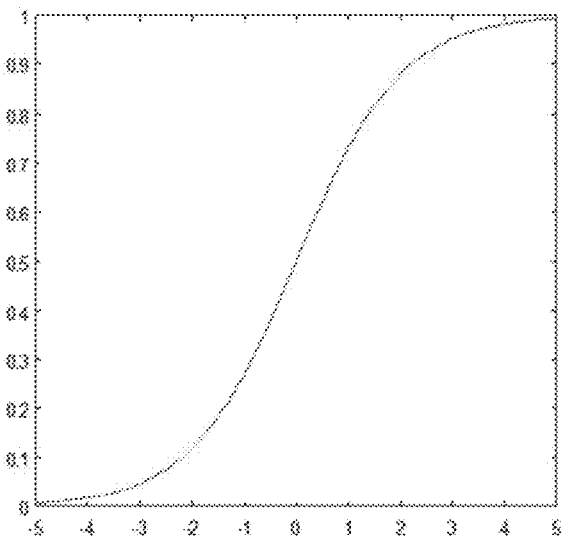
FIG. 8C is a diagram depicting an exemplary continuous trigger function of a non-linear layer of a multi-layer computational structure in accordance with an embodiment of the present disclosure.
Figure 8D:
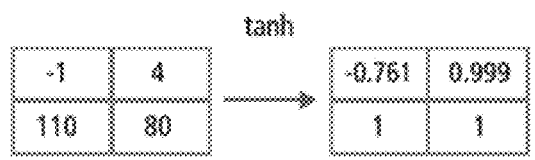
FIG. 8D is a diagram demonstrating how a non-linearity can be applied element by element in accordance with an embodiment of the present disclosure.

Referring also to FIGS. 8A, 8B, 8C, and 8D, in some embodiments, the non-linear layer may operate element by element in each feature. A continuous trigger function can be hyperbolic tangent (FIG. 8A), absolute of hyperbolic tangent (FIG. 8B), or sigmoid (FIG. 8C). FIG. 8D demonstrates how non-linearity may be applied element by element.

However, while specific examples of non-linear layers have been discussed, other non-linear layers may include, but are not limited to, sigmoid functions and rectified and absolution versions of sigmoid functions. In some embodiments, non-linear layers may include sigmoid functions that utilize tan hyperbolic or exponential functions.

Fully Connected Layers

Figure 9:
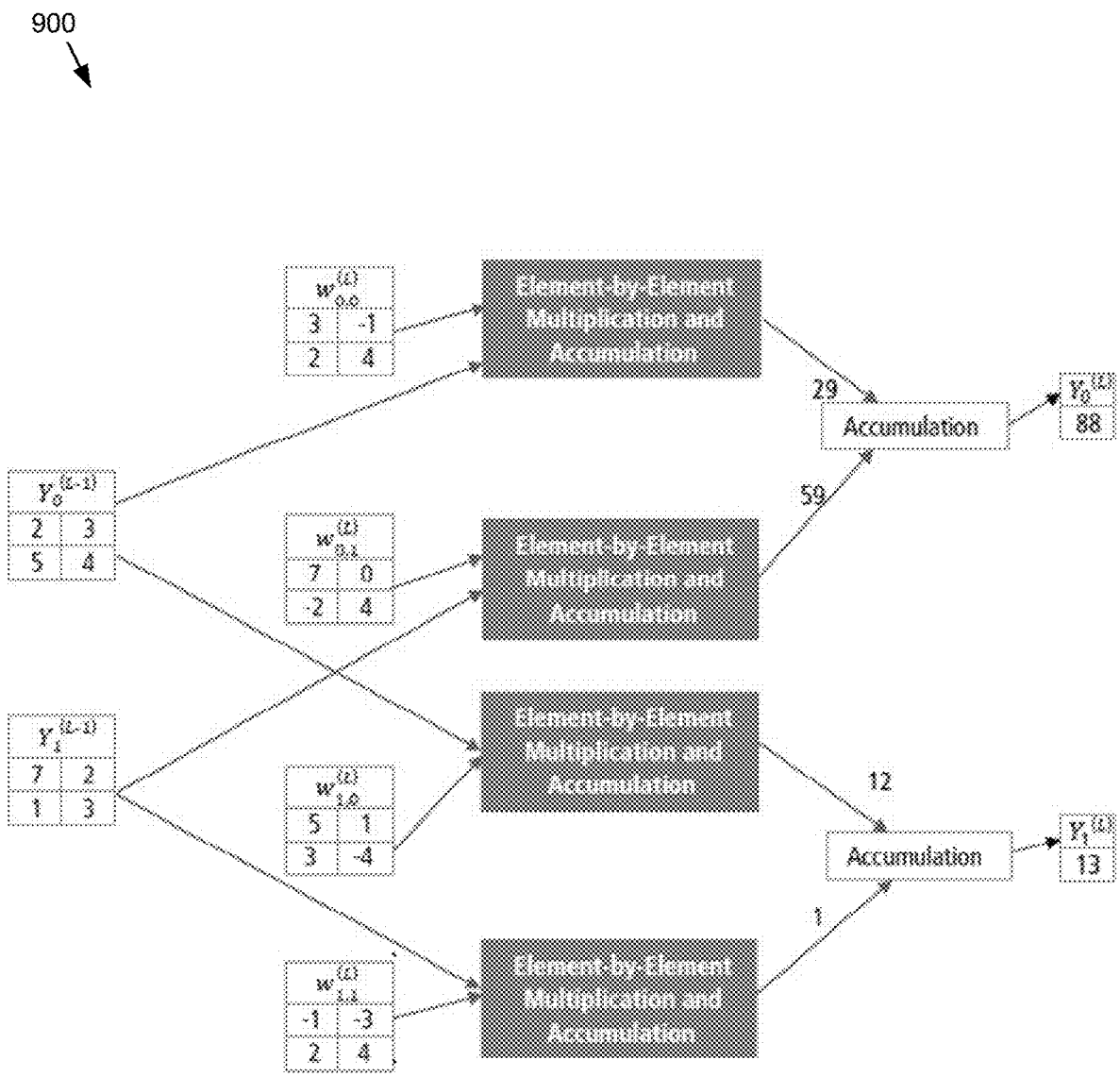
FIG. 9 is a diagram depicting a fully connected layer of a multi-layer computational structure in accordance with an embodiment of the present disclosure.

Referring also to FIG. 9, in some embodiments, fully connected layers may be used as the final layers of a multi-layer computational network. These layers can mathematically sum a weighting of the previous layer of features, indicating the precise mix of "ingredients" to determine a specific target output result. In case of a fully connected layer, all the elements of all the features of the previous layer may be used in the calculation of each element of each output feature.

FIG. 9 explains the fully connected layer L. Layer L-1 may have two features, each of which can be 2×2, i.e., may have four elements. Layer L may have two features, each can have a single element.

Figure 10:
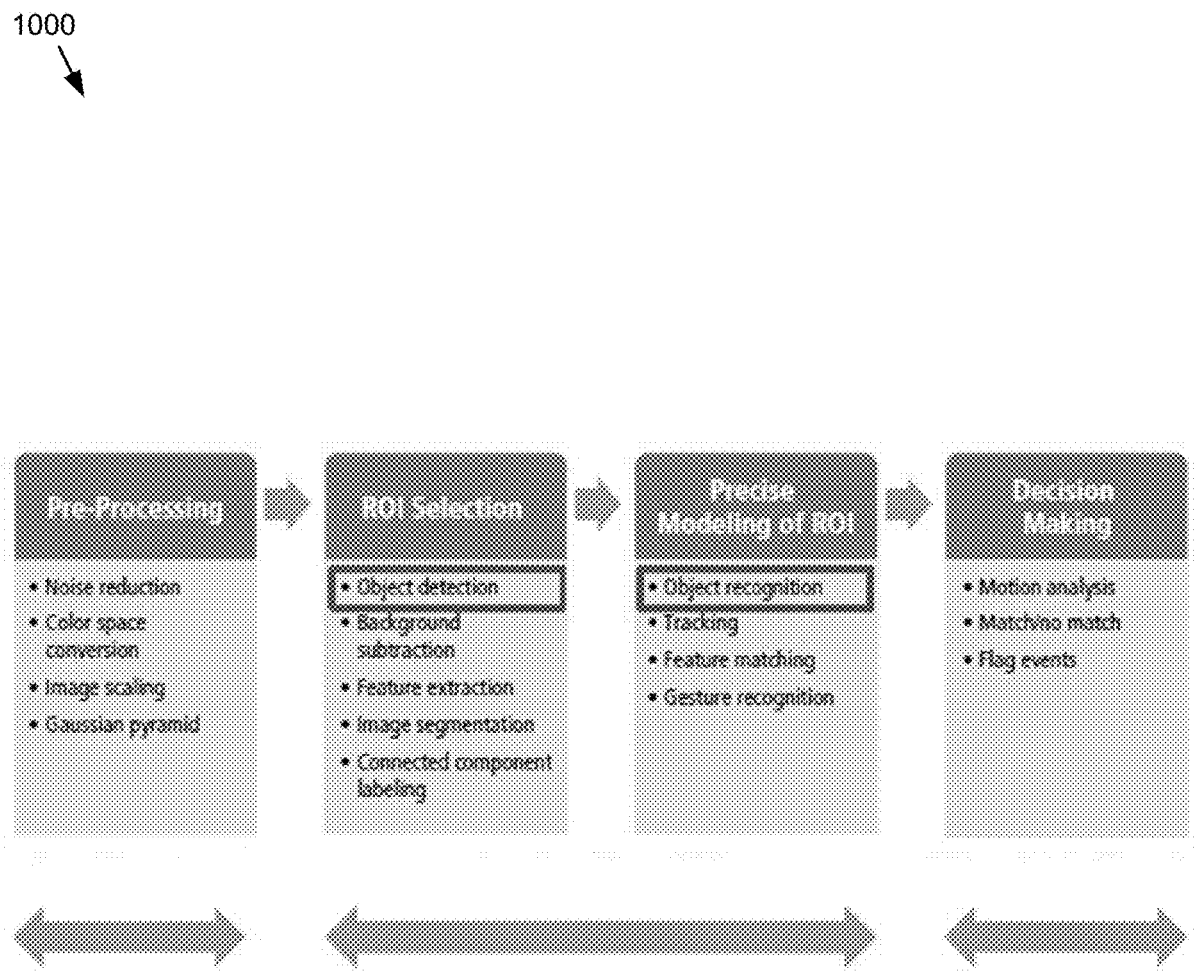
FIG. 10 is a diagram depicting a pipeline for input data recognition in accordance with an embodiment of the present disclosure.

Referring also to FIG. 10, in some embodiments, a pipeline for input recognition 1000 can include one or more stages. The one or more stages of the pipeline for input data or input recognition 1000 can include, but are not limited to, pre-processing an input, detecting regions of interest (ROI) that may contain likely objects, object recognition, and recognition decision making. The pre-processing step can be dependent on the input data, such as an input sensor and may be implemented in a hardwired unit outside of a recognition subsystem. The decision making may operate on recognized objects. The decision making stage may make complex decisions but may operate on less data so any decisions are not computationally hard or memory-intensive. Major challenges for input data recognition may occur during the object detection and object recognition stages.

Referring now to FIG. 11, a flowchart depicting an embodiment of the hyper-parameter analysis process 1100 of the present disclosure is provided. In some embodiments, hyper-parameter analysis process 1100 may include accessing (1102), using at least one processor, input data for recognition. In some embodiments, the input data can include, but is not limited to, at least one of an image, a pattern, a speech input, a natural language input, a video input, and a complex data set. Hyper-parameter analysis process 1100 may further include processing (1104) the input data using one or more layers of the multi-layer computational structure. Hyper-parameter analysis process 1100 may also include performing (1106) matrix factorization of the one or more layers. Hyper-parameter analysis process 1100 may further include analyzing (1108) one or more hyper-parameters for the one or more layers based upon, at least in part, the matrix factorization of the one or more layers.

Figure 12:
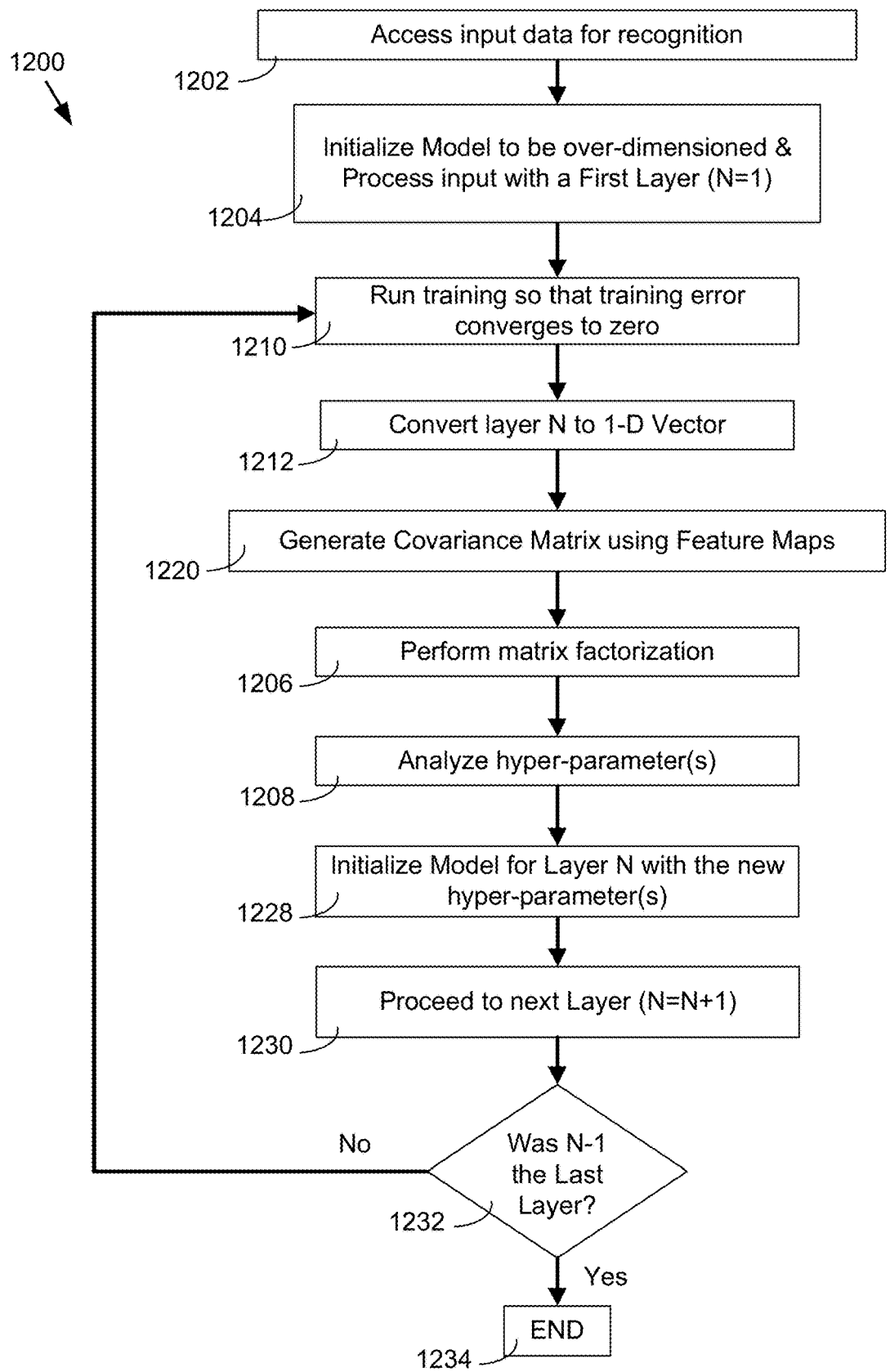
FIG. 12 is a diagram depicting a workflow of the hyper-parameter analysis process in accordance with an embodiment of the present disclosure.

Referring also to FIG. 12, in some embodiments, hyper-parameter analysis process 1200 may include accessing (1202), using at least one processor, input data for recognition. In some embodiments, input data can be accessed for recognition or an input can be received for recognition. As such, as used herein, a "input data" and an "input" may be used interchangeably. In one example, input data or input can include an image of a traffic signal that may be accessed for recognition.

In some embodiments, hyper-parameter analysis process 1200 may further include processing (1204) the input using one or more layers of the multi-layer computational structure. As discussed above regarding multi-layer computational structures and as shown in FIG. 4, an input can be processed by one or more layers of a multi-layer computational structure. Continuing with the traffic signal example, the input can be processed by one or more layers of a multi-layer computational structure. In one embodiment, a first layer of the one or more layers of the multi-layer computational structure can extract low-level features such as edges, lines and corners. A second layer of the one or more layers of the multi-layer computational structure can extract higher level features of the input, as are known in the art. A third layer of the one or more layers of the multi-layer computational structure can extract features from features of the second layer, and so on. The one or more layers of the multi-layer computational structure can create a system or a model. Processing the input data using one or more layers of the multi-layer computational structure can include initializing a model. In one example, the model can be initialized. Initialized as used herein may include, but is not limited to, initial training of an over-dimensioned system. In one example with N layers, the model can be initialized with the one or more layers, N=1. In some embodiments, the system can include one or more layers and each layer can have one or more feature maps. In one example, the initialized model can be over-dimensioned. An over-dimensioned system can be a system with more feature maps than may be required. In some embodiments, a pre-trained multi-layer computational structure may be used.

Figure 13:
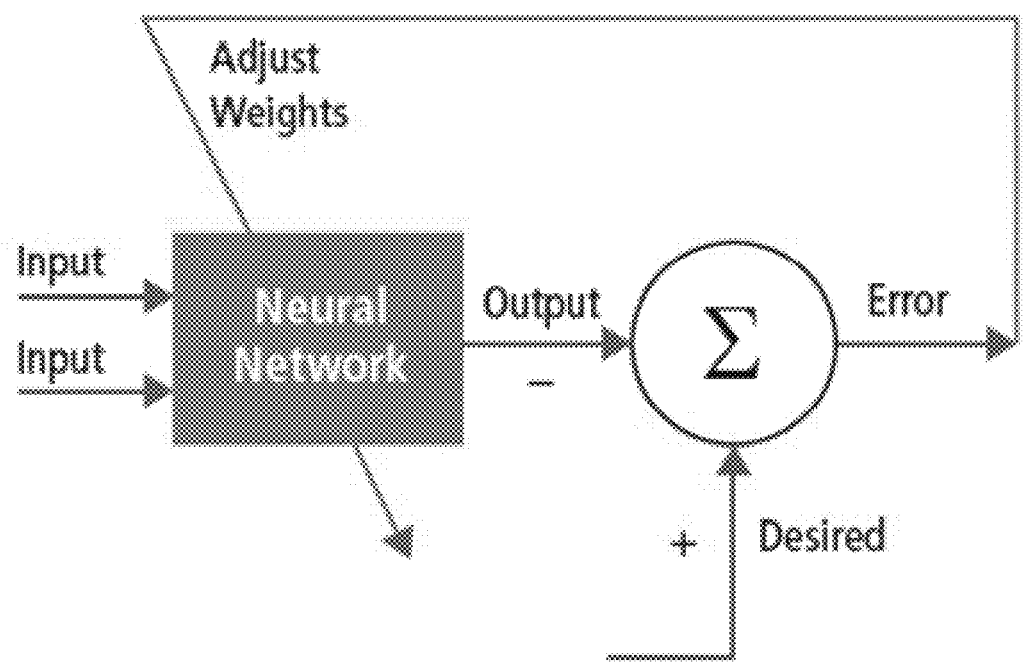
FIG. 13 is a diagram depicting a workflow of the hyper-parameter analysis process in accordance with an embodiment of the present disclosure.

Referring again to FIGS. 12 and 13, in some embodiments, the hyper-parameter analysis process 1200 may include training (1210) one or more filters for the one or more layers of the multi-layer computational structure. In some embodiments, the one or more filters (or kernels) of a system can be trained. In one example, an over-dimensioned system with a larger than required number of feature maps can include one or more filters for the one or more layers. One example of training may include back-propagation training. Training may be performed using a "labeled" dataset of inputs in a wide assortment of representative input patterns that may be tagged with their intended output response. Training may use a general-purpose methods to iteratively determine one or more weights for intermediate and final neurons. During training, the training error, $E_{Train}$ can be minimized. However the actual measure of performance is the test error, $E_{Test}$ which can be larger than the training error with the relationship as shown in Equation 1 below:

$$E_{Test} - E_{Train} = k\left(\frac{h}{P}\right)^\alpha \quad (1)$$

Referring to Equation 1, "h" can denote the "effective capacity" or complexity of a machine, P can represent a number of training samples, and k & α can be arbitrary constants. Hence a larger than required "effective capacity" can have a detrimental impact on performance (over-fitting). In one example, having a larger than required "effective capacity" may increase training costs and/or implementation costs. However it must also be remembered that $E_{Train}$ can also depend on "h", and having an "effective capacity" which can be too small can limit the achievable maximum reduction of $E_{Train}$ (under-fitting). The one or more filters of the system can be trained until the training error converges to zero. In some embodiments, the one or more trained filters can be extracted from the one or more layers. Returning the traffic signal image example, one or more filters can be trained for one or more layers of the multi-layer computational structure corresponding to the traffic signal image. The trained filters from one or more layers of the multi-layer computational structure corresponding to the traffic signal image can be extracted. In one example, the filters can be trained 3D, or three dimensional, filters.

In some embodiments, a CNN may be desirable for input recognition because of easier and better training. For example, using a standard weight that may be equivalent to a CNN can result in a longer training time because the number of parameters would be much higher for the standard neural network and can therefore increase the training time proportionately. In a CNN, since the number of parameters may be drastically reduced, training time can be proportionately reduced. Also, assuming perfect training, a standard neural network can be designed whose performance would be same as a CNN. But in practical training, a standard neural network equivalent to CNN would have more parameters, which may lead to more noise addition during the training process. Therefore the performance of a standard neural network equivalent to a CNN may be poorer.

Figure 14:
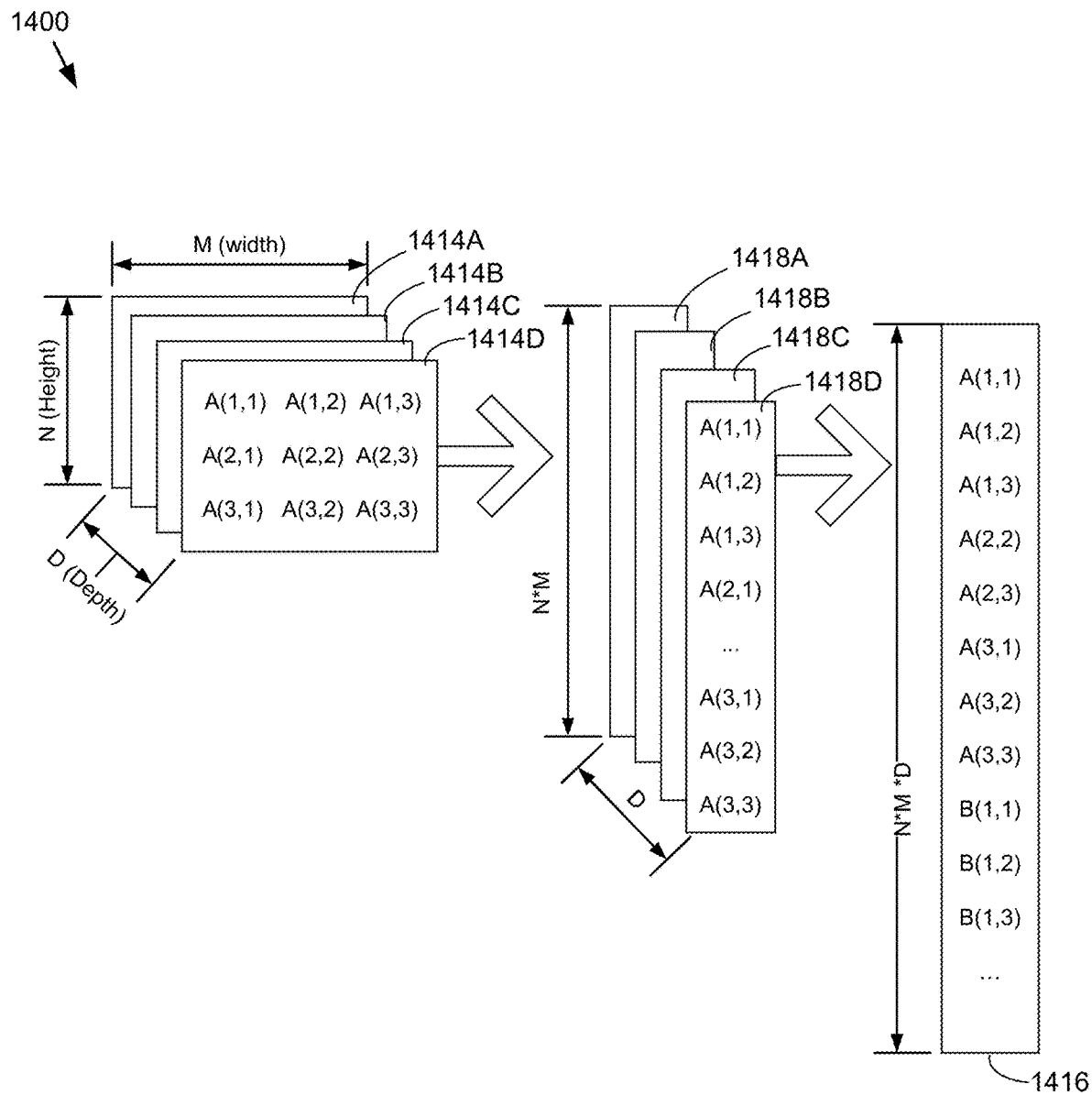
FIG. 14 is a diagram depicting aspects of the hyper-parameter analysis process in accordance with an embodiment of the present disclosure.

Referring to FIGS. 12 and 14, in some embodiments, the hyper-parameter analysis process 1200 may also include converting (1212) the one or more filters of the one or more layers to one or more vectors. The trained filters may be converted to one or more vectors. Referring again to the traffic signal image example, three dimensional convolution filters 1414A, 1414B, 1414C, 1414D may be converted to a single column vector 1416. Each of the three dimensional trained filters can be of size M×N×D, where M is height, N is width, and D is the initial depth. These trained filters 1414A, 1414B, 1414C, 1414D can be converted to obtain one or more vectors 1418A, 1418B, 1418C, 1418D of size ((M*N)×D). In one example, this may be accomplished by concatenating the columns of the two spatial dimensions (M & N) to form a single column vector per depth dimension 1418A, 1418B, 1418C, 1418D. In some embodiments, a single column vector 1416 of size ((M*N*D)×1) can be formed by concatenating all vectors from the depth dimensions 1418A, 1418B, 1418C, 1418D.

In some embodiments, the hyper-parameter analysis process 1200 may further include generating (1220) a covariance matrix using a plurality of vectors. One or more vectors may be used to generate the covariance matrix. In one example, a vector $V_{lp}$ may have a size of M*N*D, for a feature map p, and layer l. There may be $K_l$ total feature maps in the convolution layer l. $K_l$ total feature maps may correspond to $K_l$ vectors for the layer. A covariance matrix can be generated for this layer ($R_{cov_l}$) as shown in Equation 2 below, where $V_{lp}^T$ can correspond to the transpose of vector $V_{lp}$. The covariance matrix can have dimensions L×L, where L can equal M*N*p.

$$R_{COV_l} = \sum_{p=0}^{K_l-1} V_{lp} V_{lp}^T \quad (2)$$

Returning to the traffic signal image example, one or more single column vectors 1416 related to the traffic signal image may be used to generate a covariance matrix according to Equation 2 where $K_l$ total feature maps can correspond to $K_l$ vectors for each of the one or more layers of the multi-layer computational structure.

As discussed above, hyper-parameter analysis process 1200 may include performing (1206) matrix factorization of the one or more layers. In some embodiments, the correlation between weights within the multi-layer computational structure may be utilized by performing matrix factorization of the weight correlation matrices of the one or more layers. Matrix factorization may, in some embodiments, express a covariance matrix as the product of a plurality of matrices. In other words, matrix factorization may decompose a square matrix into basis weight values and basis vectors. Matrix factorization can be accomplished by various algorithms. Matrix factorization as used herein may include, but is not limited to, spectral decomposition, eigen decomposition, independent component analysis (ICA), zero component analysis (ZCA), or any other decomposition into one or more basis sets to enable weighting of the contribution of one or more components in a multi-layer computational structure.

In one non-limiting example, eigen decomposition can be performed on the one or more layers. An example of an algorithm for performing eigen decomposition may include, but is not limited to, a QR Algorithm. In some embodiments, a correlation between filters can be used to perform eigen decomposition. In some embodiments, eigen decomposition may be performed on a symmetric matrix. In one example, eigen decomposition can be performed on the symmetric matrix $R_{cov_l}$ with dimensions L×L where L can equal M*N*p. Eigen decomposition can be performed on the matrix $R_{cov_l}$ as shown below in Equation 3, where matrix Q can be the orthonormal eigenvector matrix with each of the columns representing the basis vectors ($q_i$) of $R_{cov_l}$, matrix A can be a diagonal matrix with the elements being the basis weight values ($\sigma_k$) arranged in order of decreasing power, as shown below in Equation 4, and matrix $Q^T$ can be a transpose of matrix Q.

$$R_{cov} = QAQ^T \qquad (3)$$

$$A = \mathrm{diag}(\sigma_k) \text{ with } k=1 \text{ to } L \qquad (4)$$

The basis vectors $q_i$ may represent a complete linear orthogonal basis for signal space spanned by the one or more vectors $V_{lp}$. In some embodiments, the basis vectors may include, but are not limited to, eigenvectors. Any vector $V_{lp}$ can be expressed as linear combinations of basis vectors $q_i$ found above. Referring again to the traffic signal image example, a covariance matrix associated with the traffic signal image may be generated as discussed above according to Equation 2. Eigen decomposition of the covariance matrix can be performed to obtain the basis vectors and basis weight values associated with the one or more layers of the multi-layer computational structure for the traffic signal image. In some embodiments, basis weight values as used herein may include, but are not limited to, eigenvalues. While the above example was directed to performing matrix factorization through eigen decomposition, any matrix factorization may be used within the scope of the present disclosure.

In some embodiments, performing matrix factorization may include determining an amount of energy retained for one or more basis weight values of the one or more layers based upon, at least in part, the covariance matrix. Energy as used herein may include but is not limited to reconstruction fidelity. The basis weight values $\sigma_k$ may correspondingly represent the amount of energy retained for one or more basis vectors. In some embodiments, a Normalized Cumulative Power function (cpf) can be generated for the amount of energy retained for one or more basis weight values ($\sigma_j$) by computing the following function (Equation 5) for each basis weight value, where k can be the number of basis weight values and L can be M*N*p, where M can be the height, N can be the width, and p can be the feature map:

$$cpf(k) = \frac{\sum_{j=1}^{k} \sigma_j}{\sum_{j=1}^{L} \sigma_j} \qquad (5)$$

In some embodiments, hyper-parameter analysis process 1200 may further include analyzing (1208) one or more hyper-parameters for the one or more layers based upon, at least in part, the matrix factorization of the one or more layers. In some embodiments, analyzing one or more hyper-parameters may include, but is not limited to, estimating, changing, and reducing the one or more hyper-parameters. In one example, analyzing one or more hyper-parameters may also include analyzing an optimal number of feature maps for the one or more layers of the multi-layer computational structure. An optimal number of feature maps, as will be discussed in greater detail below, and as used herein may include, but is not limited to, the highest true detection and the lowest false detections performance. In some embodiments, the matrix factorization of the one or more layers can determine an amount of energy retained for one or more basis weight values of the one or more layers. The amount of energy retained for the one or more basis weight values can be used to generate a Normalized Cumulative Power function according to Equation 5 for each basis weight value. The Normalized Cumulative Power function may be used to analyze one or more hyper-parameters for a given amount of energy retained or energy threshold. Returning to the traffic signal image example, the basis weight values corresponding to the one or more layers of the multi-layer computational structure may be used to generate the Normalized Cumulative Power function according to Equation 5. The Normalized Cumulative Power function of the basis weight values of the one or more layers may be plotted, for example, as shown in FIG. 15.

Figure 15:
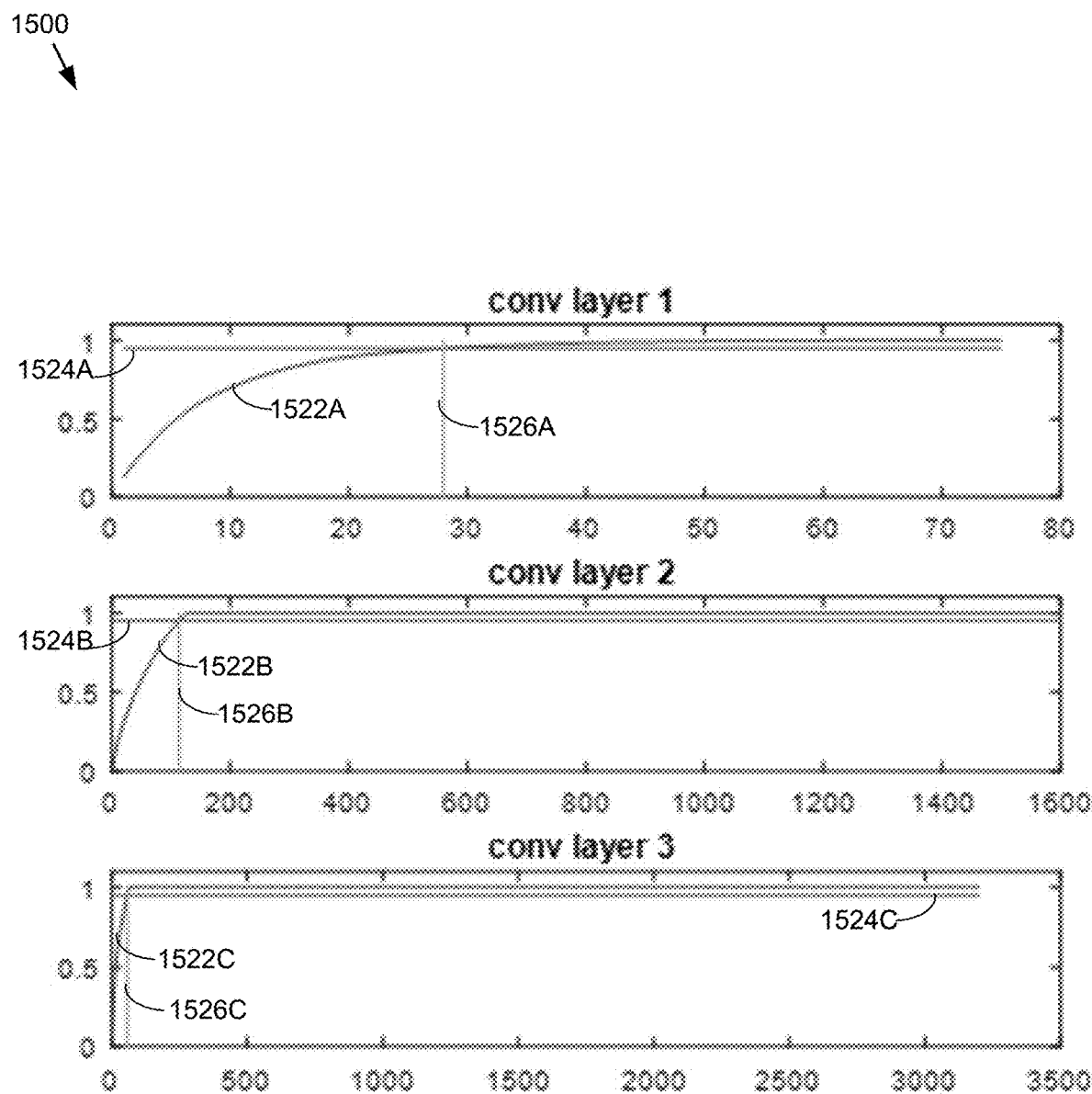
FIG. 15 is a diagram depicting aspects of the hyper-parameter analysis process related to an energy threshold in accordance with an embodiment of the present disclosure.

Referring also to FIG. 15, an amount of energy retained for the one or more layers 1522A, 1522B, 1522C may be shown on a plot of the Normalized Cumulative Power Function 1500. In this way, an amount of energy retained or energy percentage may be represented on the Y-axis. A number of feature maps may be represented on the X-axis. The plot of the Normalized Cumulative Power function for each of the one or more layers 1522A, 1522B, 1522C can represent an analyzed hyper-parameter for the one or more layers based upon, at least in part, a corresponding amount of energy retained.

In some embodiments, analyzing one or more hyper-parameters may be further based upon, at least in part, whether the amount of energy retained exceeds an energy threshold. An energy threshold may be selected based on a heuristic or desired complexity reduction. In some embodiments, basis vectors with lower basis weight values can be discarded from the representation of the signal set, because their contribution may be smaller and possibly less important. In one example, an energy threshold of 95% may be optimal. A Normalized Cumulative Power function plot may be used to determine the number of significant dimensions for one or more vectors or one or more layers based upon, at least in part, a chosen energy threshold.

Referring again to FIG. 15 and the traffic signal example, an example energy threshold of 95%, 1524A, 1524B, 1524C can give corresponding X-axis intercepts 1526A, 1526B, 1526C of 28, 114 and 56 for different layers (1, 2 and 3) 1522A, 1522B, 1522C in the multi-layer computational structure for the traffic signal image. The X-axis intercepts between each of the one or more layers 1522A, 1522B, 1522C and the energy threshold 1524A, 1524B, 1524C may correspond with one or more hyper-parameters 1526A, 1526B, 1526C for the one or more layers. In other words, based on the X-axis intercepts shown in FIG. 15, the optimal number of feature maps for layers 1, 2 and 3 of the multi-layer computational structure corresponding to the traffic signal image can be 28, 114, and 56 respectively.

In some embodiments, the number of feature maps used can impact both the performance and complexity of the multi-layer computational structure. In one embodiment, the complexity of the multi-layer computational structure can increase linearly with feature maps added at any given layer. Even the performance of a CNN can get adversely impacted by a higher than required number of feature maps due to a phenomena called over-fitting. Over-fitting can result in declining performance of a multi-layer computational structure despite increased training. In other words, over-fitting can occur when the increase in a number of feature maps reduces the performance of a multi-layer computational structure. Over-fitting can be a common problem in machine learning applications.

In some embodiments, analyzing (1208) one or more hyper-parameters for the one or more layers may be performed iteratively for each of the one or more layers. For example, the hyper-parameter analysis process can include performing matrix factorization of the first layer. In some embodiments, hyper-parameter analysis process 1200 may iteratively estimate better meta-parameters for a multi-layer computational structure. The hyper-parameter analysis process can further include analyzing one or more hyper-parameters for the first layer based upon, at least in part, the matrix factorization of the first layer. The optimal number of feature maps can be applied (1228) to the first layer. The hyper-parameter analysis process 1200 can determine (1232) if there are more layers and if there are more layers, proceed (1230) to the next layer. Alternatively, if there are no additional layers, the hyper-parameter analysis process may end (1234). The hyper-parameter analysis process 1200 can perform (1206) matrix factorization of the second layer and analyze (1208) one or more hyper-parameters for the second layer based upon, at least in part, the matrix factorization of the second layer. The optimal number of feature maps can be applied to the second layer (1228). The hyper-parameter analysis process can determine if there are more layers (1230) and proceed to the next layer (1232). In some embodiments, analyzing of one or more hyper-parameters may be performed iteratively for each layer of the one or more layers until one or more hyper-parameters has been analyzed for each of the one or more layers. In some embodiments, one or more hyper-parameters may be determined for a last layer of the one or more layers before any of the other one or more layers. The analyzing of one or more hyper-parameters may be performed iteratively beginning with the first layer to the last layer or any other order within the constraint that one or more later layers are dependent on one or more previous layers. In some embodiments, analyzing one or more hyper-parameters may be performed iteratively in any order. In another embodiment, analyzing one or more hyper-parameters can be performed iteratively until the hyper-parameter analysis process is manually or automatically ended (1234).

Additionally and/or alternatively, the hyper-parameter analysis process 1200 may also include retraining one or more filters from the one or more layers based upon, at least in part, one or more analyzed hyper-parameters for the one or more layers until one or more hyper-parameters has been analyzed for each of the one or more layers. The hyper-parameter analysis process 1200 can be applied in an iterative manner or one-layer at a time. In one example involving a number of feature maps as a hyper-parameter and after an initial training, a first layer matrix factorization analysis may be done and number of feature maps chosen for other layers can remain unchanged. The multi-layer computational structure can be trained again with the first layer number of feature maps changed to the optimal number and a new set of filters for the one or more layers can be obtained. Matrix factorization analysis for the second layer can be performed on this new set of filters and consequently a number of feature maps for the second layer may be obtained. With the changed number of feature maps for the second layer, the multi-layer computational structure can be retrained and the matrix factorization analysis can be done for the third layer and so on until the feature map dimension has been analyzed for each of the one or more layers of the multi-layer computational structure.

In some embodiments, retraining of the multi-layer computational structure may be performed iteratively. In some embodiments, retraining may start from the first layer of the one or more layers of the multi-layer computational structure to the last layer of the one or more layers. In some embodiments, the multi-layer computational structure may be retrained in any order within the constraint that succeeding layers of the one or more layers are dependent upon one or more previous layers. In some embodiments, the multi-layer computational structure may be retrained from a largest layer of the one or more layers. This can be a complete or partial retraining of the multi-layer computational structure after each successive matrix factorization of the one or more layers. In some embodiments, partial retraining of the structure can reduce training time in conjunction with complexity reduction. In some embodiments, a complete retraining of the multi-layer computational structure after each successive matrix factorization of the one or more layers. In some embodiments, partial retraining can be done by initializing the weights of a layer to be retrained based on a parameters obtained from matrix factorization done on same layer trained in the previous iteration. While the above example was directed toward one hyper-parameter (e.g., number of feature maps), any hyper-parameter may be used.

Figure 16:
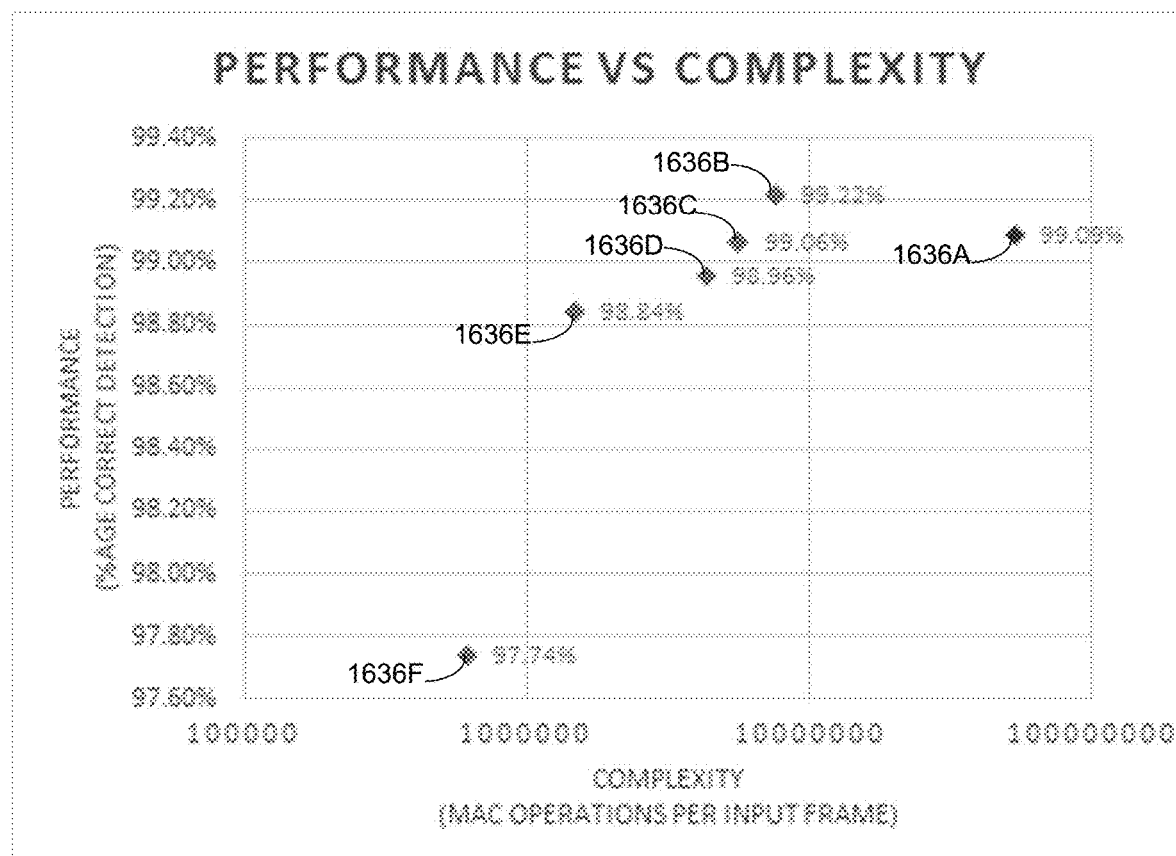
FIG. 16 is a graph depicting performance aspects of the hyper-parameter analysis process in accordance with an embodiment of the present disclosure.

Referring Table 1 below, the results in Table 1 were obtained by starting with a baseline as 100% energy retained and continually reducing the energy threshold compared to the baseline and measuring performance. Referring also to FIG. 16, the complexity of a multi-layer computational structure can be compared to the performance of the multi-layer computational structure based upon, at least in part, a feature map dimension of the one or more layers of the multi-layer computational structure and energy threshold. The "performance" of FIG. 16 may relate to a percentage of accurate or correct detections. Other energy thresholds include, but are not limited to, 100% 1636A, 95% 1636B, 90% 1636C, 85% 1636D, 75% 1636E and 60% 1636F. In one example, directed to a number of feature maps, as the energy threshold is reduced, the number of feature maps may be reduced, as can the detection performance. A reduced number of feature maps can also mean reduced complexity. The "complexity" of FIG. 16 may refer to computation complexity in Multiply Accumulate (MAC) operations per image or per input frame. In FIG. 16, the rightmost point may be the baseline 1636A. The performance may increase initially when the energy threshold is reduced and the number of feature maps is reduced. This may occur because overfitting with an excessive number of feature maps may degrade the performance. So at first reducing energy may improve performance. However, as the energy threshold is reduced further, the detection performance may decrease.

TABLE 1

| ENERGY THRESHOLD | Number of Neurons (1-2-3 layers) | Complexity in MAC Operations Per Image | Detection Performance |
|---|---|---|---|
| BASELINE (100%) | 100-200-100 | 53057243 | 99.09% |
| 95% | 15-180-90 | 7552873 | 99.22% |
| 90% | 12-165-83 | 5609634 | 99.06% |
| 85% | 10-150-76 | 4296209 | 98.96% |
| 75% | 8-60-50 | 1468115 | 98.84% |
| 60% | 6-30-30 | 614039 | 97.74% |

In some embodiments, analyzing one or more hyper-parameters can determine an optimal number of feature maps. An optimal number of feature maps may minimize overfitting due to an excessive number of feature maps that might otherwise be used in a multi-layer computational structure. Referring the Table 1, by analyzing one or more hyper-parameters for the one or more layers of the multi-layer computational structure, the detection performance was increased (from 99.09% to 99.22%) by reducing the number of excess feature maps. In some embodiments, by reducing the number of feature maps (from 100-200-100 to 15-180-90, respectively), overfitting of the multi-layer computational structure may be minimized. In other words, as the energy threshold is reduced, the number of feature maps may go down steadily. A reduced number of feature maps may also reduce computation complexity in MAC operations per input. In other words, as shown in Table 1 and FIG. 16, application of the hyper-parameter analysis process 1200 may drastically reduce the complexity of the multi-layer computational structure without any performance degradation, or with a small controlled correct detection rate (CDR) reduction.

Alternatively and/or additionally in some embodiments, analyzing the one or more hyper-parameters of the one or more layers may be further based upon, at least in part, balancing a computational load between the one or more layers of the multi-layer computational structure. Balancing a computational load can require analyzing a different optimal number of feature maps than one or more hyper-parameters analyzed for reducing complexity. Referring again to Table 1, the optimal number of feature maps of the one or more layers can be analyzed to balance the computational load or MAC operations per image between one or more layers. In some embodiments, using matrix factorization for balancing computation load between layers in a multi-layer computational structure, can allow an optimal performance per unit of computation.

In some embodiments, the hyper-parameter analysis process 1200 may also include receiving a complexity target and adjusting the energy threshold until the complexity target is achieved. A lower complexity version of a multi-layer computational structure can be obtained by considering increasingly smaller energy thresholds and hence choosing smaller number of feature maps across the one or more layers. Alternatively, a higher complexity version of a multi-layer computational structure can be obtained by considering increasingly larger energy thresholds and choosing larger number of feature maps across the one or more layers. However, a lower complexity version can lead to some degradation in detection performance, but can help achieve a chosen complexity target for implementation. The present disclosure, in some embodiments, may allow using matrix factorization for generation of lower-complexity sub-optimal multi-layer computational structures for targeting a particular complexity target or criteria. Additionally, in other embodiments, the hyper-parameter analysis process can utilize the correlation between multi-layer computational structure coefficients to reduce complexity.

In some embodiments, the one or more hyper-parameters can be analyzed to reduce memory usage, reduce computation complexity, minimize a number of feature maps, minimize a number of weights, minimize a number of layers, reduce an estimated cost, estimate an implementation cost, etc.

In another embodiment of the present disclosure a system for analyzing hyper-parameters of a multi-layer computational structure is provided. The system may include a computing device having at least one processor configured to access input data for recognition. In some embodiments, the input data may at least one of an image, a pattern, a speech input, a natural language input, a video input, and a complex data set. The least one processor may be further configured to process the input data using one or more layers of the multi-layer computational structure. In some embodiments, the at least one processor may be further configured to perform matrix factorization of the one or more layers. In some embodiments, the at least one processor may be further configured to analyze one or more hyper-parameters for the one or more layers based upon, at least in part, the matrix factorization of the one or more layers.

In yet another embodiment of the present disclosure a computer-readable storage medium having stored thereon instructions that when executed by a machine result in a number of operations is provided. Some operations may include accessing input data for recognition. In some embodiments, the input data may include, but is not limited to, at least one of an image, a pattern, a speech input, a natural language input, a video input, and a complex data set. Operations may further include processing the input data using one or more layers of the multi-layer computational structure. Operations may also include performing matrix factorization of the one or more layers. Operations may further include analyzing one or more hyper-parameters for the one or more layers based upon, at least in part, the matrix factorization of the one or more layers.

Embodiments of the present disclosure may be incorporated in whole or in part into multi-layer computational structure simulation or training tools. In some embodiments, simulation tools may interact with the hyper-parameter analysis process as part of an automated tool or script for complexity reduction of a multi-layer computational structure.

In some embodiments, teachings of the present disclosure may be used for analyzing the optimal number of feature maps for a multi-layer computational structure such that the object detection performance may be enhanced and/or erroneous object detections and misclassifications may be minimized. Additionally or alternatively, the present disclosure may in some embodiments, teach using matrix factorization for complexity reduction of a multi-layer computational structure.

The present disclosure may provide a reasonably accurate first analysis of the number of feature maps, or hyper-parameter, required for a particular layer within a multi-layer computational structure. In some embodiments of the present disclosure, one or more hyper-parameters required for an entire multi-layer computational structure may be determined. Additionally, in some embodiments, a hyper-parameter may be analyzed to reduce the number of feature maps in a multi-layer computational structure for complexity reduction with a minimal impact on performance.

As used in any embodiment described herein, "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for analyzing hyper-parameters of a multi-layer computational structure comprising:
   accessing, using at least one processor, input data for recognition, wherein the input data includes at least one of an image, a pattern, a speech input, a natural language input, a video input, and a complex data set;
   processing the input data using one or more layers of the multi-layer computational structure;
   performing matrix factorization of the one or more layers of the multi-layer computational structure;
   analyzing one or more hyper-parameters of the one or more layers based upon, at least in part, the matrix factorization of the one or more layers;
   training one or more filters of the one or more layers; and
   converting one or more trained filters of the one or more layers to a plurality vectors.

2. The computer-implemented method of claim 1, further comprising:
   generating a covariance matrix using the plurality of vectors.

3. The computer-implemented method of claim 2, wherein performing matrix factorization includes determining an amount of energy retained for one or more basis weight values of the one or more layers based upon, at least in part, the covariance matrix.

4. The computer-implemented method of claim 3, wherein analyzing one or more hyper-parameters of the one or more layers is further based upon, at least in part, whether the amount of energy retained exceeds an energy threshold.

5. The computer-implemented method of claim 4, further comprising:
   receiving a complexity target and adjusting the energy threshold until the complexity target is achieved.

6. The computer-implemented method of claim 1, wherein analyzing one or more hyper-parameters of the one or more layers is performed iteratively for each of the one or more layers.

7. The computer-implemented method of claim 6, wherein analyzing one or more hyper-parameters of the one or more layers includes at least one of estimating, changing, and reducing a number of feature maps.

8. The computer-implemented method of claim 1, wherein the multi-layer computational structure is one or more of a neural network with weights, a convolutional neural network, a deep belief network, a recurrent neural network and an autoencoder.

9. The computer-implemented method of claim 1, wherein analyzing one or more hyper-parameters of the one or more layers is further based upon, at least in part, one or more of balancing a computational load between the one or more layers of the multi-layer computational structure, reducing over-fitting, estimating an implementation cost, and improving a detection performance.

10. The computer-implemented method of claim 1, wherein the one or more hyper-parameters includes one or more of a number of feature maps for each of the one or more layers and a number of weights for each of the one or more layers.

11. The computer-implemented method of claim 1, further comprising:
    Retraining the one or more filters of the one of more layers, based upon, at least in part, the analyzing of the one or more hyper-parameters of the one or more layers.

12. The computer-implemented method of claim 11, wherein retraining the one or more layers is performed iteratively.

13. The computer-implemented method of claim 11, wherein retraining one or more layers is one or more of a partial retraining of each layer of the one or more layers and a complete retraining of each layer of the one or more layers.

14. The computer-implemented method of claim 1, wherein the multi-layer computational structure includes at least one of: one or more pooling layers, one or more non-linear functions, one or more convolution layers with uniform filters and one or more convolutional layers with non-uniform filters.

15. The computer-implemented method of claim 1, wherein the multi-layer computational structure includes a plurality of hybrid layers wherein the feature maps of each of the plurality of hybrid layers is associated with one or more different feature maps of one or more previous layers.

16. A system for analyzing the optimal number of feature maps for a multi-layer computational structure comprising:
    a computing device having at least one processor configured to receive input data for recognition, wherein the input data includes at least one of an image, a pattern, a speech input, a natural language input, a video input, and a complex data set, the at least one processor further configured to process the input data using one or more layers of the multi-layer computational structure, the at least one processor further configured to perform matrix factorization of the one or more layers, and the at least one processor further configured to analyze one or more hyper-parameters for the one or more layers based upon, at least in part, the matrix factorization of the one or more layers, wherein the at least one processor is further configured to train one or more filters from the one or more layers and wherein the at least one processor is further configured to retrain the one or more filters of the one or more layers, based upon, at least in part, the analyzing of the one or more hyper-parameters of the one or more layers.

17. The system of claim 16, wherein the at least one processor is further configured to convert the one or more filters to a plurality vectors.

18. The system of claim 17, wherein the at least one processor is further configured to generate a covariance matrix using the plurality of vectors.

19. The system of claim 18, wherein performing matrix factorization includes determining an amount of energy retained for one or more basis weight values of the one or more layers based upon, at least in part, the covariance matrix.

20. The system of claim 19, wherein analyzing one or more hyper-parameters for the one or more layers is further based upon, at least in part, whether the amount of energy retained exceeds an energy threshold.

21. The system of claim 20, wherein the at least one processor is further configured to receive a complexity target and adjusting the energy threshold until the complexity target is achieved.

22. The computer-implemented method of claim 16, wherein analyzing one or more hyper-parameters for the one or more layers is performed iteratively for each of the one or more layers.

23. The computer-implemented method of claim 22, wherein analyzing one or more hyper-parameters includes at least one of estimating, changing, and reducing a number of feature maps.

24. The system of claim 16, wherein the multi-layer computational structure is one or more of a neural network with weights, a convolutional neural network, a deep belief network, a recurrent neural network and an autoencoder.

25. The system of claim 16, wherein analyzing the optimal number of feature maps for the one or more layers is further based upon, at least in part, one or more of balancing a computational load between the one or more layers of the multi-layer computational structure, reducing overfitting, and improving detection performance.

26. The system of claim 16, wherein the one or more hyper-parameters includes one or more of a number of feature maps for each of the one or more layers and a number of weights for each of the one or more layers.

27. The system of claim 16, wherein retraining the one or more layers is performed iteratively.

28. The system of claim 16, wherein retraining one or more layers is one or more of a partial retraining of each layer of the one or more layers and a complete retraining of each layer of the one or more layers.

29. The system of claim 16, wherein the multi-layer computational structure includes at least one of: one or more pooling layers, one or more non-linear functions, one or more convolution layers with uniform filters and one or more convolutional layers with non-uniform filters.

30. The system of claim 16, wherein the multi-layer computational structure includes a plurality of hybrid layers wherein the feature maps of each of the plurality of hybrid layers is associated with one or more different feature maps of one or more previous layers.

31. A non-transitory computer-readable storage medium for analyzing hyper-parameters of a multi-layer computational structure, the computer-readable storage medium having stored thereon instructions that when executed by a machine result in the following operations:

accessing input data for recognition, wherein the input data includes at least one of an image, a pattern, a speech input, a natural language input, a video input, and a complex data set;
processing the input data using one or more layers of the multi-layer computational structure;
performing matrix factorization of the one or more layers;
analyzing one or more hyper-parameters of the one or more layers based upon, at least in part, the matrix factorization of the one or more layers; and
wherein the multi-layer computational structure includes a plurality of hybrid layers wherein the feature maps of each of the plurality of hybrid layers is associated with one or more different feature maps of one or more previous layers.

32. The computer-readable storage medium of claim 31, wherein operations further comprise:
training one or more filters from the one or more layers.

33. The computer-readable storage medium of claim 32, wherein operations further comprise:
converting the one or more filters of the first layer to a plurality of vectors.

34. The computer-readable storage medium of claim 33, wherein operations further comprise:
generating a covariance matrix using the plurality of vectors.

35. The computer-readable storage medium of claim 34, wherein performing matrix factorization includes determining an amount of energy retained for one or more basis weight values of the one or more layers based upon, at least in part, the covariance matrix.

36. The computer-readable storage medium of claim 35, wherein analyzing one or more hyper-parameters for the one or more layers is further based upon, at least in part, whether the amount of energy retained exceeds an energy threshold.

37. The computer-readable storage medium of claim 36, wherein operations further comprise:
receiving a complexity target and adjusting the energy threshold until the complexity target is achieved.

38. The computer-readable storage medium of claim 32, wherein operations further comprise:
retraining the one or more filters of the one or more layers, based upon, at least in part, the analyzing of the one or more hyper-parameters of the one or more layers.

39. The computer-readable storage medium of claim 38, wherein the retraining one or more layers is performed iteratively.

40. The computer-readable storage medium of claim 38, wherein retraining one or more layers is one or more of a partial retraining of each layer of the one or more layers and a complete retraining of each layer of the one or more layers.

41. The computer-readable storage medium of claim 31, wherein analyzing one or more hyper-parameters for the one or more layers is performed iteratively for each of the one or more layers.

42. The computer-readable storage medium of claim 41, wherein analyzing one or more hyper-parameters includes at least one of estimating, changing, and reducing a number of feature maps.

43. The computer-readable storage medium of claim 31, wherein the multi-layer computational structure is one or more of a neural network, a convolutional neural network, a deep belief network, a recurrent neural network and an autoencoder.

44. The computer-readable storage medium of claim 31, wherein analyzing the optimal number of feature maps for the one or more layers is further based upon, at least in part, one or more of balancing a computational load between the one or more layers of the multi-layer computational structure, reducing overfitting, and improving detection performance.

45. The computer-readable storage medium of claim 31, wherein the one or more hyper-parameters includes one or more of a number of feature maps for each of the one or more layers and a number of weights for each of the one or more layers.

46. The computer-readable storage medium of claim 31, wherein the multi-layer computational structure includes at least one of: one or more pooling layers, one or more non-linear functions, one or more convolution layers with uniform filters and one or more convolutional layers with non-uniform filters.

* * * * *